(12) United States Patent
Philips

(10) Patent No.: US 9,510,500 B2
(45) Date of Patent: Dec. 6, 2016

(54) METHOD AND APPARATUS FOR APPLYING MATTER TO A FIELD

(76) Inventor: Wayne Frederick Laurence Philips, Clacklin (AU)

( * ) Notice: Subject to any disclaimer, the term of this patent is extended or adjusted under 35 U.S.C. 154(b) by 512 days.

(21) Appl. No.: 13/505,888

(22) PCT Filed: Nov. 8, 2010

(86) PCT No.: PCT/AU2010/001487
§ 371 (c)(1),
(2), (4) Date: Aug. 17, 2012

(87) PCT Pub. No.: WO2011/054059
PCT Pub. Date: May 12, 2011

(65) Prior Publication Data
US 2012/0298021 A1   Nov. 29, 2012

(30) Foreign Application Priority Data

Nov. 6, 2009   (AU) ................................ 2009905440
Aug. 24, 2010   (AU) ................................ 2010903795

(51) Int. Cl.
*A01C 3/06*   (2006.01)
*A01C 23/00*   (2006.01)
*A01C 23/02*   (2006.01)

(52) U.S. Cl.
CPC .............. *A01C 3/06* (2013.01); *A01C 23/002* (2013.01); *A01C 23/025* (2013.01)

(58) Field of Classification Search
CPC ...... A01C 21/00; A01C 15/16; A01C 23/00; A01C 3/06; A01C 3/00; A01C 23/002; A01C 23/001; A01C 23/025; A01C 23/023; A01C 23/02; A01B 17/00; A01B 25/00; A01B 35/32; A01B 49/06; A01B 79/02; A01B 33/16
See application file for complete search history.

(56) References Cited

U.S. PATENT DOCUMENTS

| | | | | |
|---|---|---|---|---|
| 3,485,480 A * | 12/1969 | Silver | .............................. | 264/83 |
| 4,012,322 A * | 3/1977 | Saigh et al. | ..................... | 210/86 |
| 4,114,815 A * | 9/1978 | Gijsbers | ......................... | 241/45 |
| 4,161,792 A * | 7/1979 | Dallen et al. | .................. | 4/111.1 |
| 4,232,616 A * | 11/1980 | van der Lely | ................ | 111/121 |
| 5,891,330 A * | 4/1999 | Morris | .......................... | 210/104 |
| 7,026,006 B1 * | 4/2006 | McArthur et al. | ............ | 426/637 |

FOREIGN PATENT DOCUMENTS

| | | | |
|---|---|---|---|
| EP | 0438187 A1 * | 7/1991 | |
| EP | 0520784 A1 * | 12/1992 | |

* cited by examiner

*Primary Examiner* — Christopher J Novosad

(57) ABSTRACT

An apparatus (30) for applying matter to a field is disclosed. The apparatus (30) comprises a macerator (54) for macerating the matter, at least one ground-engaging tool (42) for tilling the field, and an outlet (47) from which the macerated matter is able to be extruded into or onto the tilled field.

31 Claims, 23 Drawing Sheets

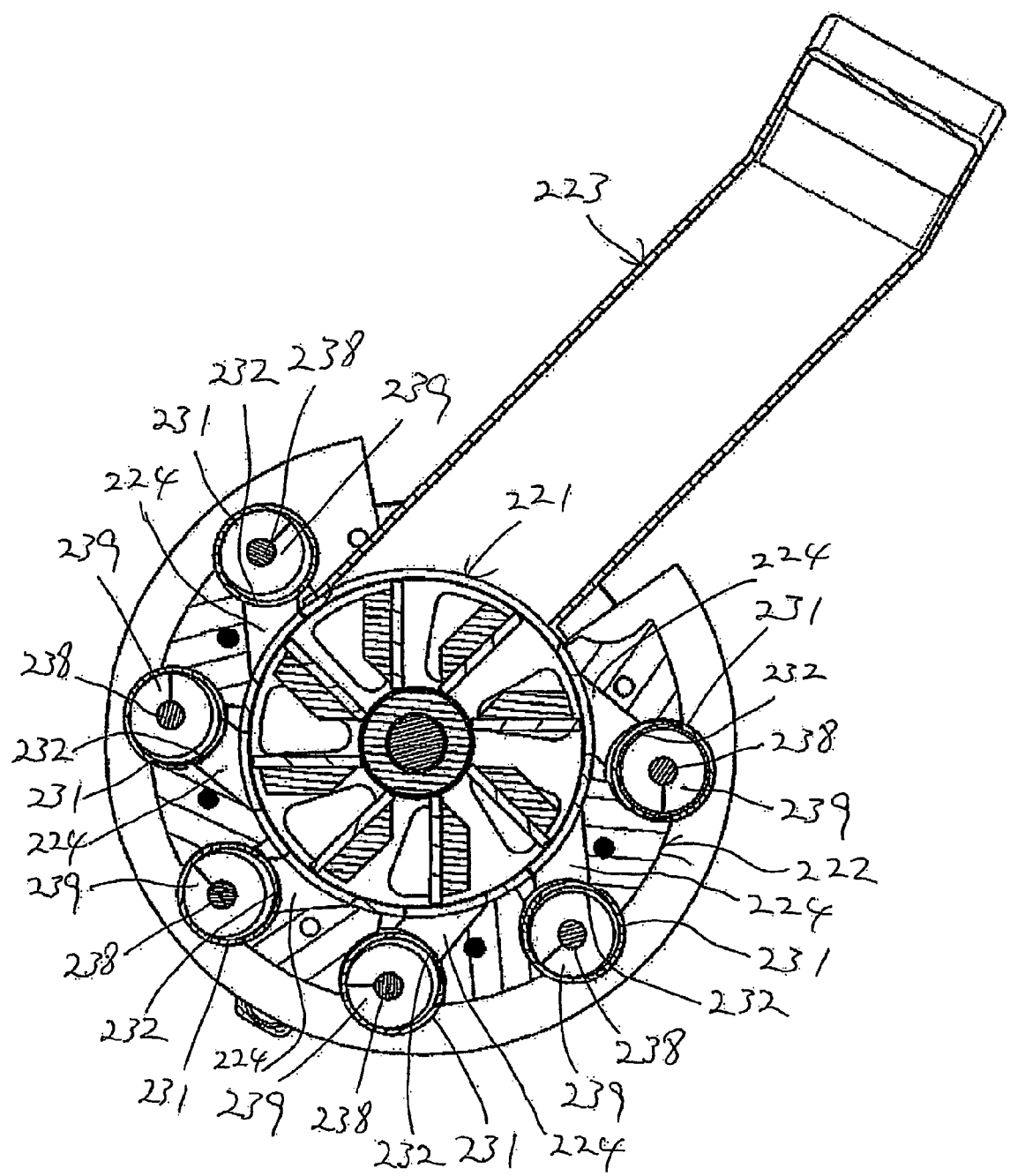

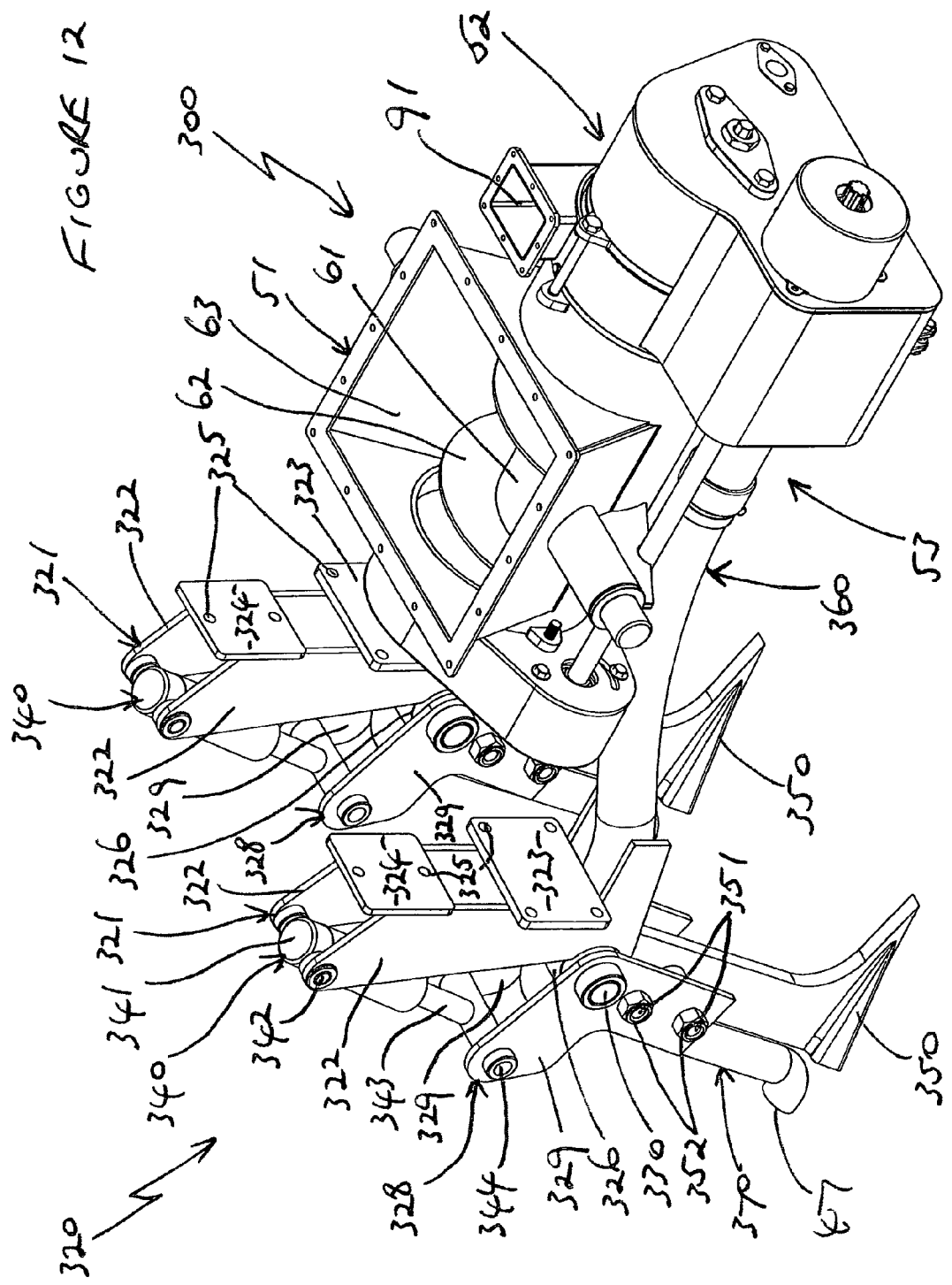

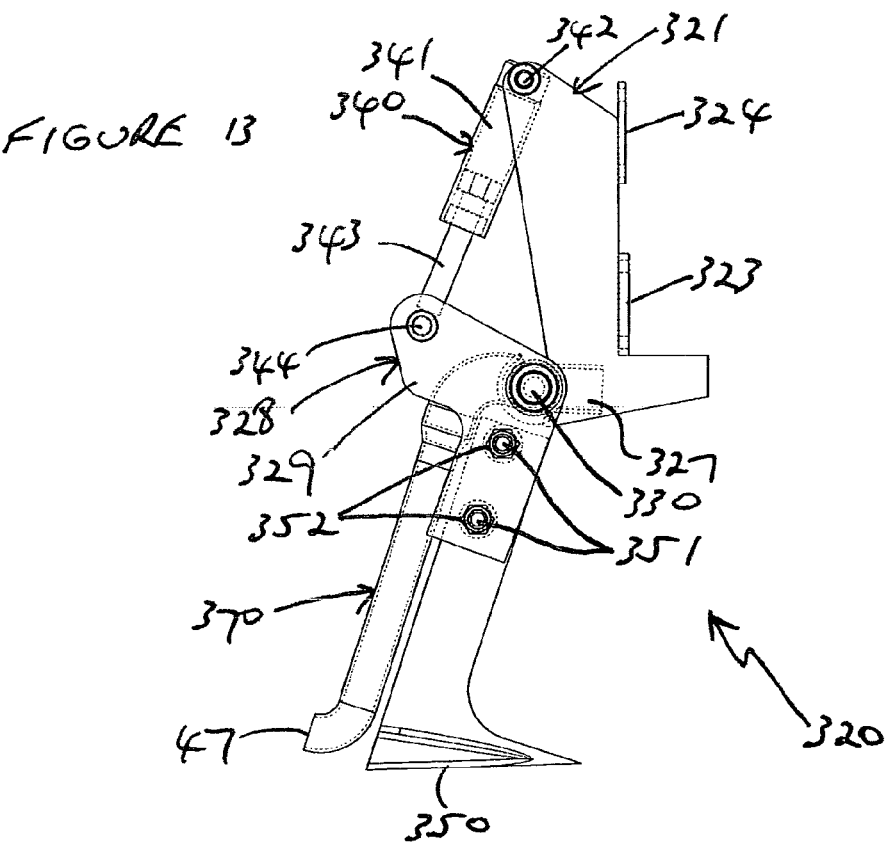
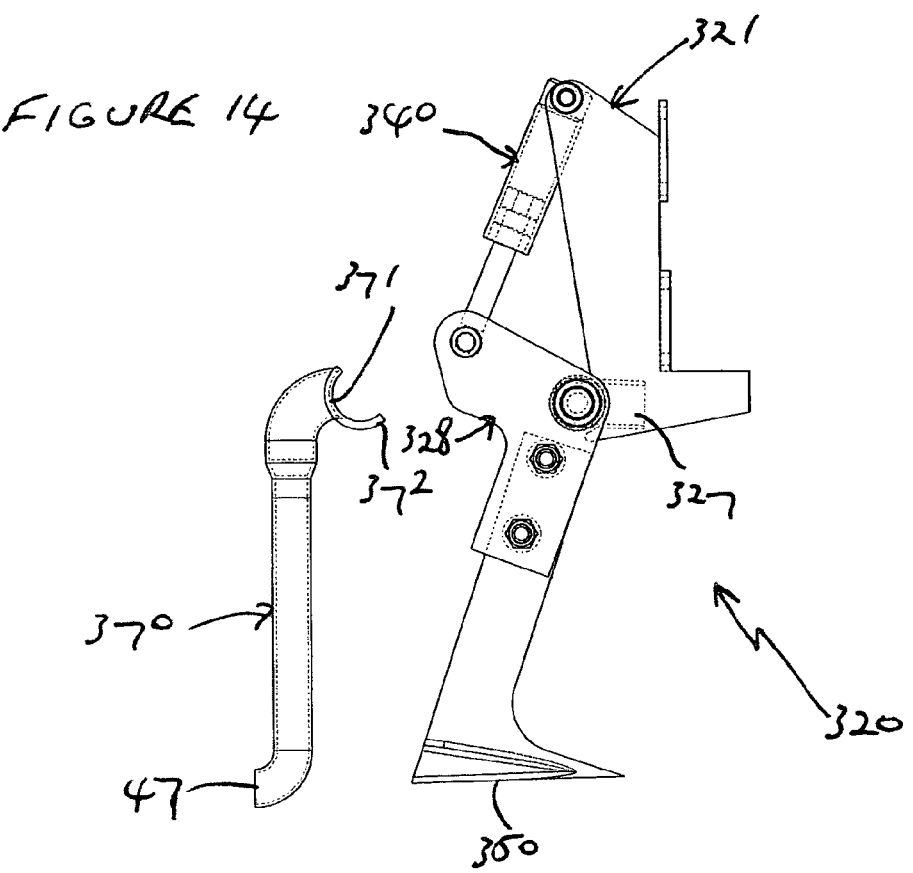

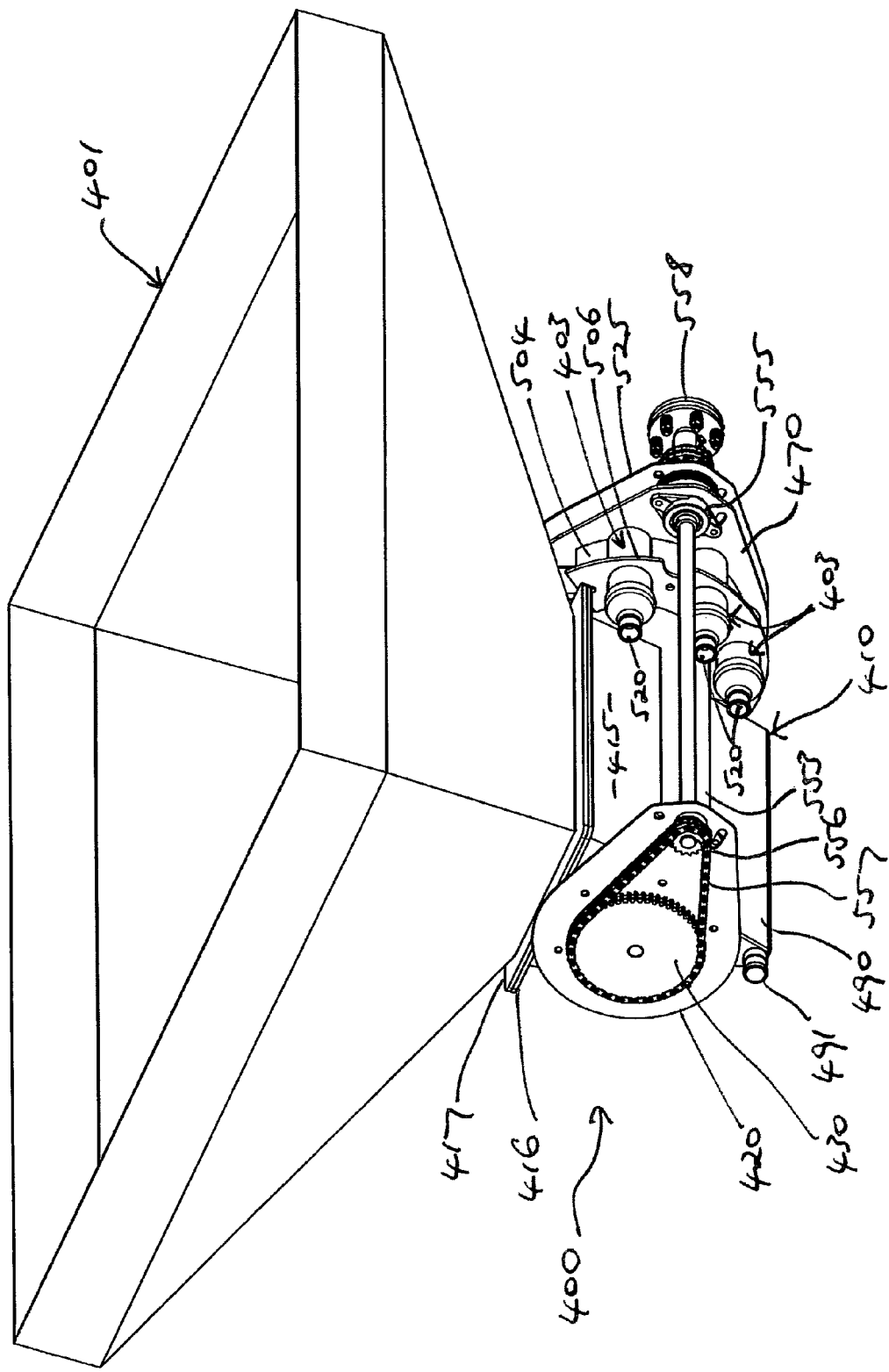

METHOD AND APPARATUS FOR APPLYING MATTER TO A FIELD

FIELD OF THE INVENTION

The present invention relates generally to methods and apparatus for applying matter to a field and, in particular, to methods and apparatus for applying solid matter to a field.

Although the present invention will be described with particular reference to applying rough compost and animal manure to a field, it will be appreciated that the invention is not limited to applying such matter to a field, and that it may be used to apply other matter to a field. For example, the invention may be used to apply inorganic fertiliser or living microbes into the sub-soil of a field.

BACKGROUND ART

The application of composts and manures to a field, and the seeding or planting of a crop in the field is historically done with several operations and passes over the field.

When applying composts and manures to a field in large scale farming operations, it is desirable to optimise the utilisation of the material resource (i.e. compost or manure), and to consolidate machinery operations.

It is highly desirable to extend the time that nutrients and moisture are available to plants. Making the moisture and nutrients available to plants for an extended period of time helps to make the plants more productive.

It is also desirable to stop the nutrients being mobile in the soil and leeching out into adjacent waterways.

It is also highly desirable to keep carbon in the ground and out of the atmosphere.

It is desirable to provide sanctuary to soil microbiology that will enable it to survive during extended dry periods (e.g. between cropping over summer). It is desirable to encourage the proliferation of beneficial soil microbiology.

In agriculture, hardpan is a general term for a dense layer of soil, usually found below the uppermost topsoil layer. There are different types of hardpan, all sharing the general characteristic of being a distinct soil layer that is largely impervious to water. Some hardpans are formed by deposits in the soil that fuse and bind the soil particles. These deposits can range from dissolved silica to matrices formed from iron oxides and calcium carbonate. Others are man-made, such as hardpan formed by compaction from repeated ploughing and/or heavy traffic and pollution from man-made sources.

Hardpan can be a problem in farming by impeding drainage of water and restricting the growth of plant roots. In these situations, the hardpan can be broken-up by either mechanical means such as digging or ploughing, or through the use of soil amendments.

A problem with ploughing the hardpan to break it up is that the hardpan will tend to reform, particularly if, after being broken-up, the soil is again compacted from repeated ploughing etc.

Soil amendments can be employed to alter the soil structure and promote dissolution of the hardpan. It has been observed that increasing the amount of soil organic matter through the working-in of manure, compost, or peat can both improve local drainage and promote the proliferation of earth worms that can, over time, break relatively thin hardpan layers.

A problem with using soil amendments such as manure and compost to break-up hardpan is that the manure and compost can be difficult to work into the soil.

Soil cultivation at the hardpan level includes several obstacles, including compaction, as mentioned above, which acts to reduce the ability of the soil to absorb and retain moisture. Reducing the ability of the soil to absorb and retain moisture consequently results in a build-up of contaminants such as salts that plant roots cannot penetrate, and that can cause harm to plants.

Nutrients, salts and other contaminants resting on the hardpan are more likely to be dissolved and transported through the topsoil to contaminate other areas such as waterways. The leaching of salts and nutrients is a well documented source of pollution for waterways.

Deep ripping to beneath the hardpan over large areas to add soil amendments that assist to halt the leaching of nutrients and salts is expensive and time consuming. Without a soil amendment or proper management, the hardpan will reform.

Traditionally, the adding of soil amendments and the sowing of a crop involve several operations. Any means of limiting the amount of operations and optimising inputs is desirable for several reasons, including: lessening exposure of the soil to heavy machinery which can compact the soil and create hardpan; lessening the time, energy, and capital spent on cultivation operations; more efficient use of fertilisers; and retention of moisture in the subsoil.

Placement of soil amendments such as compost increases the percentage of organic material that is in the soil and that is able to retain nutrients and moisture.

Before they are placed in the soil, it is usually desirable to pelletise/concentrate/compress composts and manures to slow the release of nutrients from them and, in particular, to aid in the slowing of de-nitrification.

It is desirable to add charcoal to the compost or manure as these materials are complementary in their ability to provide sanctuary to living soil microbes and will enhance the ability of the compost/manure and the living microbes contained in the compost/manure to store carbon in the subsoil with the advantage of providing plant nutrients.

Traditionally, the pelletisation process takes place at a location that is remote from the field that is being cultivated, and additional transportation is required for delivery to the pelletising plant of the raw materials, including compost or manure, to be pelletised, and to deliver the pelletised material to the field.

The process of pressure pelletisation destroys any living organisms that are a desirable product of the composting process. Pelletisation also destroys the desirable structure of the charcoal particles that may be added to the compost or manure as part of the pelletising process.

Presently, several operations are involved in applying extruded or pelletised compost or manure to a field, and then planting or sowing the field. These operations include: transporting the raw materials from which the pellets are made to a processing plant for pelletisation; transporting the pelletised material to the field; spreading the pelletised material on the field; ploughing the pelletised material into the field; and sowing or planting the crop into the field, and simultaneously installing water drip irrigation tubes.

Apparatus for applying slurries/liquids into or onto the ground are known. Examples of such apparatus are disclosed by the following published patent documents: U.S. Pat. No. 4,232,616 (VAN DER LELY); EP 0,520,784 B1 (GREENTRAC LIMITED); U.S. Pat. No. 4,114,815 (GIJSBERS); WO 2006/133697 A1 (STOLBERG-ROHR); and GB 2,251,166 A (CAVANAGH et al.). All of the apparatus disclosed by these documents receive pre-processed material that is already in a liquid slurry form.

It is against this background that the present invention has been developed.

SUMMARY OF THE INVENTION

It is an object of the present invention to overcome, or at least ameliorate, one or more of the deficiencies of the prior art mentioned above, or to provide the consumer with a useful or commercial choice.

Other objects and advantages of the present invention will become apparent from the following description, taken in connection with the accompanying drawings, wherein, by way of illustration and example, a preferred embodiment of the present invention is disclosed.

According to a first broad aspect of the present invention, there is provided a method for applying matter to a field, the method comprising the steps of:
  macerating the matter;
  tilling the field; and
  discharging the macerated matter into or onto the tilled field.

Preferably, the matter includes rough compost, animal manure, charcoal, or other solid material.

Preferably, the matter includes a liquid. It is preferred that the liquid includes water.

Preferably, the macerated matter is in the form of a slurry.

Preferably, the macerating step includes forcing the matter through a macerating plate with an auger.

Preferably, the method also includes the step of storing the matter in a vessel. Preferably, the method also includes the step of returning the macerated matter to the vessel.

Preferably, the tilling step includes ploughing, ripping, harrowing, turning, cultivating, or otherwise tilling the field.

Preferably, the discharging step includes extruding the macerated matter into or onto the tilled field. Preferably, the discharging step includes pumping the macerated matter out of an outlet.

Preferably, the method also includes the step of laying a water drip pipe alongside the matter that is discharged into or onto the tilled field.

According to a second broad aspect of the present invention, there is provided an apparatus for applying matter to a field, the apparatus comprising a macerator for macerating the matter, at least one ground-engaging tool for tilling the field, and an outlet from which the macerated matter is able to be discharged into or onto the tilled field.

The apparatus may be used to discharge matter that includes rough compost, animal manure, charcoal, and/or other solid material into or onto the tilled field. It may also be used to extrude matter that includes a liquid such as, for example, water into or onto the tilled field.

Preferably, the macerator includes a macerating plate, and an auger for forcing the matter through the macerating plate.

Preferably, the apparatus also includes a vessel for storing the matter. It is preferred that the vessel is a tank or a hopper.

Preferably, the apparatus also includes a discharge pump for pumping the macerated matter out of the outlet. Although it is preferred that the discharge pump is an auger, it will be appreciated that the discharge pump is not necessarily limited to being an auger. For example, instead of being an auger, the discharge pump may be a progressive cavity pump.

Preferably, the apparatus also includes an agitating pump for pumping the macerated matter to the vessel or to the discharge pump. It is particularly preferred that the agitating pump is a vane pump. The vane pump preferably includes a plurality of vanes, and a plurality of macerating blades secured to the vanes. Preferably, the discharge pump is able to be selectively connected to the agitating pump so that the agitating pump is able to pump the macerated matter to the discharge pump.

In one preferred form, the macerator, agitating pump, and the discharge pump are each driven by a shaft that is coupled to a power take-off of a vehicle. In another preferred form, the apparatus includes at least one motor for driving the macerator, agitating pump, and the discharge pump. Preferably, each motor is a hydraulic motor.

Preferably, each ground-engaging tool is selected from a group comprising: a ripper leg; tine; and a disc. The disc is preferably a cutler disc.

Preferably, the apparatus also includes at least one rotatable support for facilitating traversal of the apparatus across the field. It is preferred that each rotatable support includes a wheel.

Preferably, the apparatus is adapted to be towed by a vehicle. It is preferred that the apparatus includes a drawbar for coupling the apparatus to the towing vehicle. In a particular preferred form, the drawbar is an A-frame drawbar.

Preferably, the apparatus also includes a reel for storing a water drip pipe such that the pipe is able to be drawn from the reel and laid alongside the matter that is discharged into or onto the tilled field.

According to a third broad aspect of the present invention, there is provided a macerating and pumping apparatus comprising:
  a macerator for macerating matter stored in a vessel;
  a discharge pump for pumping the macerated matter out of an outlet; and
  an agitating pump for pumping the macerated matter to the vessel or the discharge pump.

Preferably, the macerator includes a macerating plate, and an auger for forcing the matter through the macerating plate.

Preferably, the discharge pump is able to be selectively connected to me agitating pump so that the agitating pump is able to pump the macerated matter to the discharge pump. Although it is preferred that the discharge pump is an auger, it will be appreciated that the discharge pump is not, necessarily limited to being an auger. For example, instead of being an auger, the discharge pump may be a progressive cavity pump.

Preferably, the agitating pump is a vane pump. The vane pump preferably includes a plurality of vanes, and a plurality of macerating blades secured to the vanes.

BRIEF DESCRIPTION OF THE DRAWINGS

In order that the invention may be more fully understood and put into practice, a preferred embodiment thereof will now be described with reference to the accompanying drawings, in which:

FIG. 11 is a lateral cross-sectional view of the alternative macerating and pumping unit depicted in FIG. 8 which shows how the agitating pump is, able to be connected to each of the discharge pumps of the unit so that matter is able to pass from the agitating pump to each of the discharge pumps;

FIG. 12 is a perspective view of another alternative macerating and pump unit and an alternative ground-engaging tool mounting assembly for the apparatus depicted in FIG. 1;

FIG. 13 is a side elevation of the ground-engaging tool mounting assembly depicted in FIG. 12 when an outlet pipe of the apparatus is secured relative to the mechanism;

FIG. 14 is a side elevation of the ground-engaging tool mounting assembly and outlet pipe depicted in FIG. 12 prior to the outlet pipe being secured relative to the mechanism;

FIG. 15 is a perspective view of a hopper attached to another alternative macerating and pumping unit;

BEST MODE(S) FOR CARRYING OUT THE INVENTION

Figure 1:
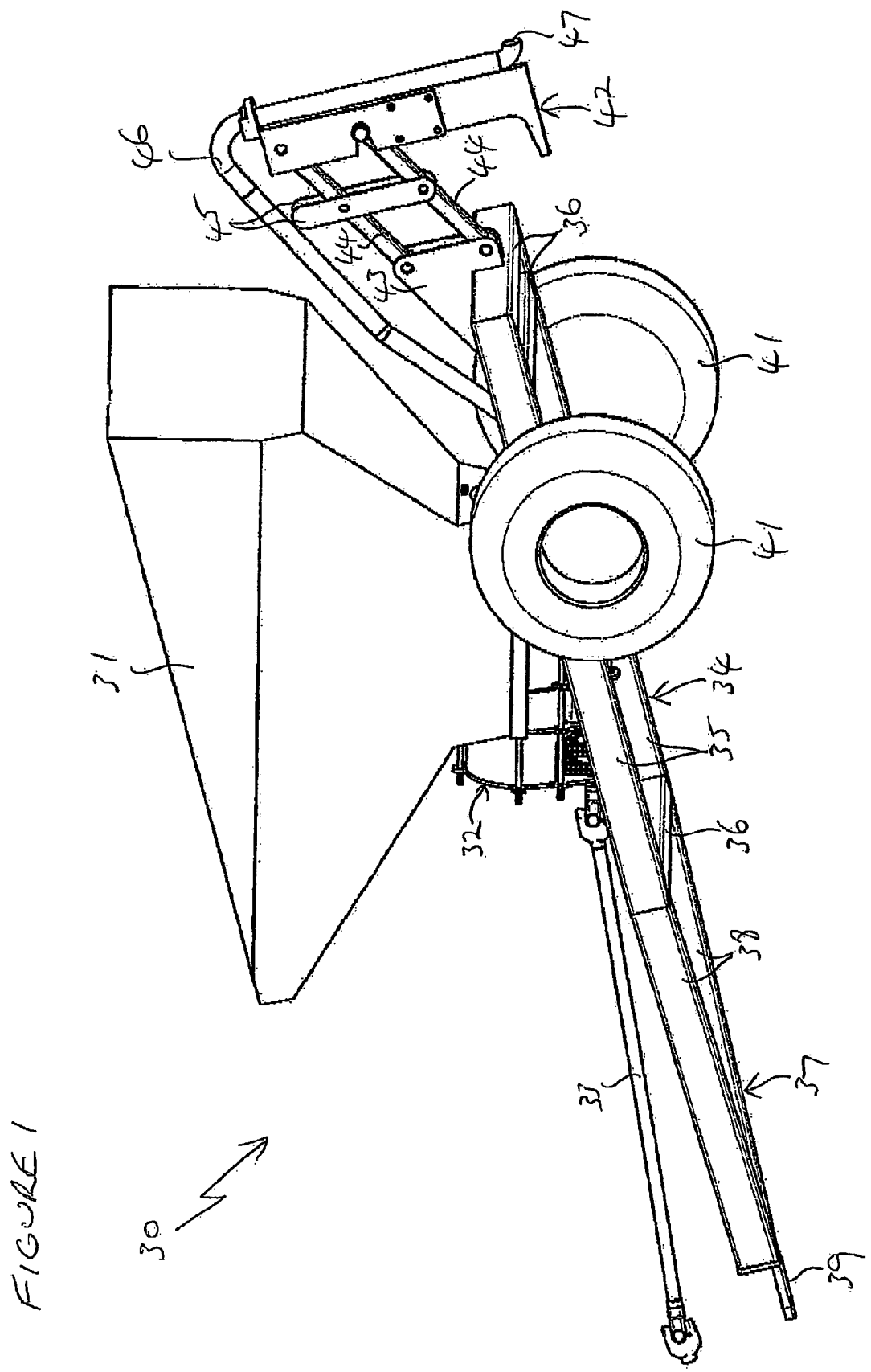
FIG. 1 is a side perspective view of an apparatus for applying matter to a field.

In the drawings, like reference numbers have been used to reference like features of at least some of the various preferred embodiments.

Figure 2:
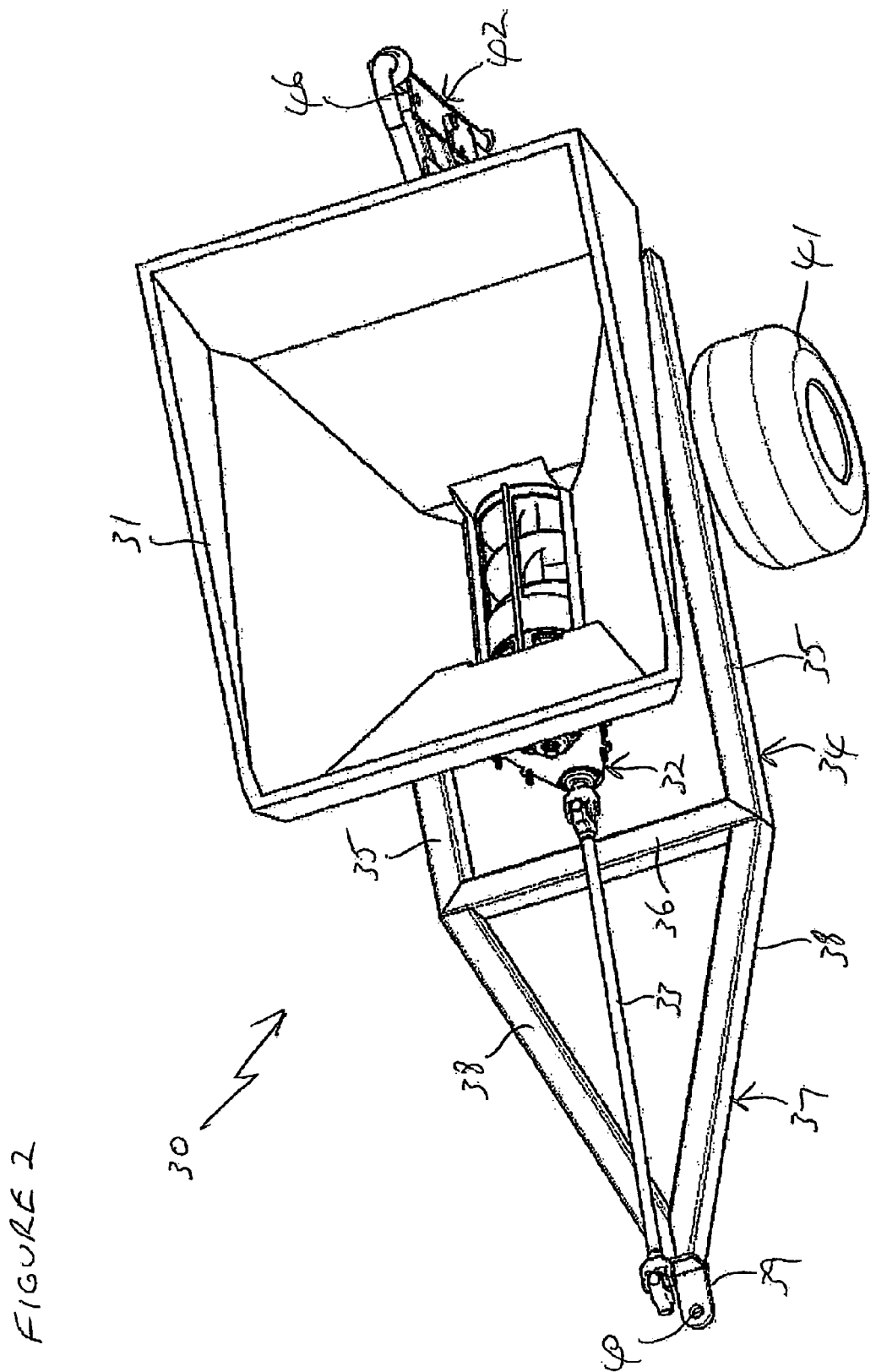
FIG. 2 is a top perspective view of the apparatus depicted in FIG. 1.
Figure 3:
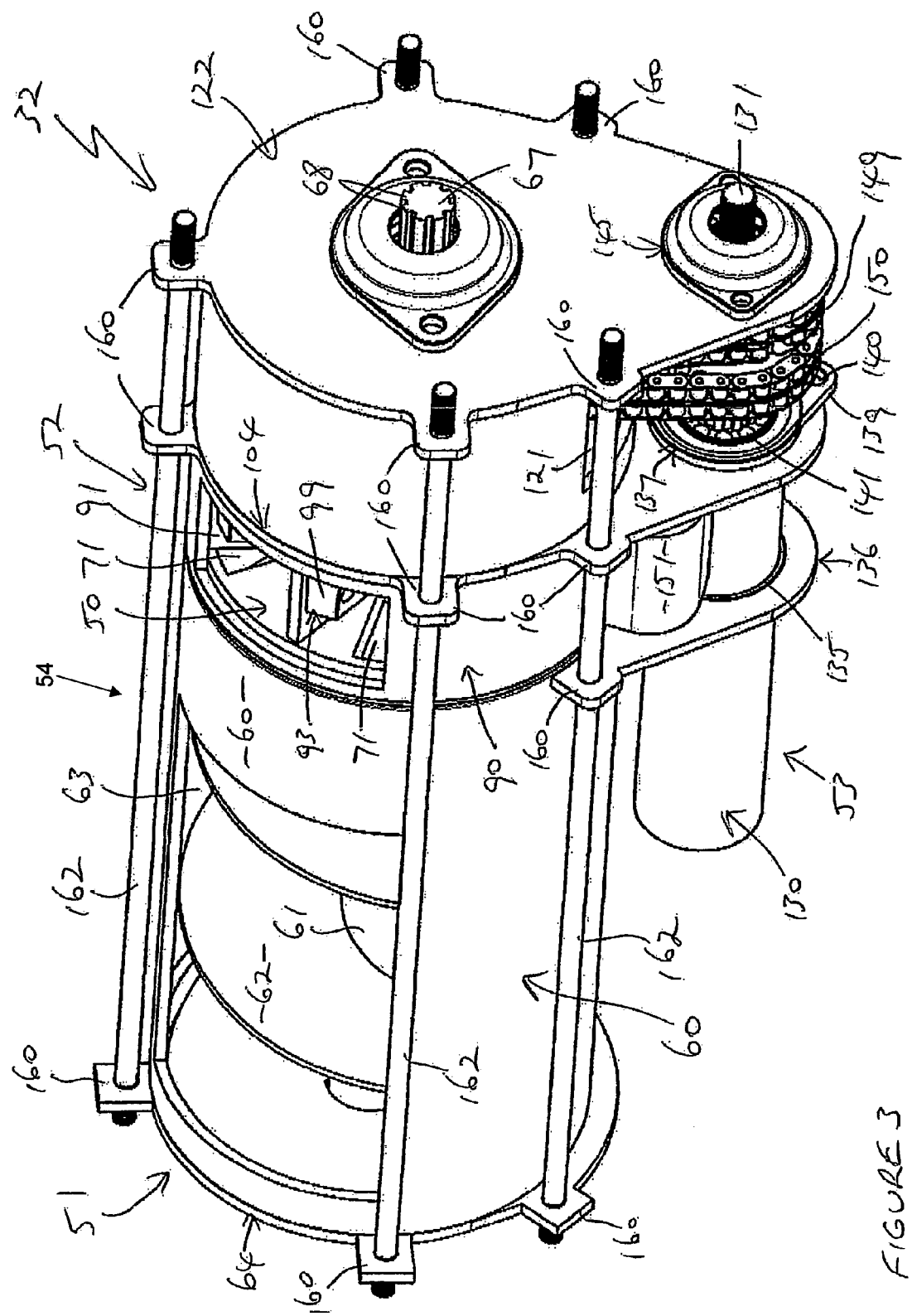
FIG. 3 is a perspective view of a macerating and pumping unit of the apparatus depicted in FIG. 1.
Figure 4:
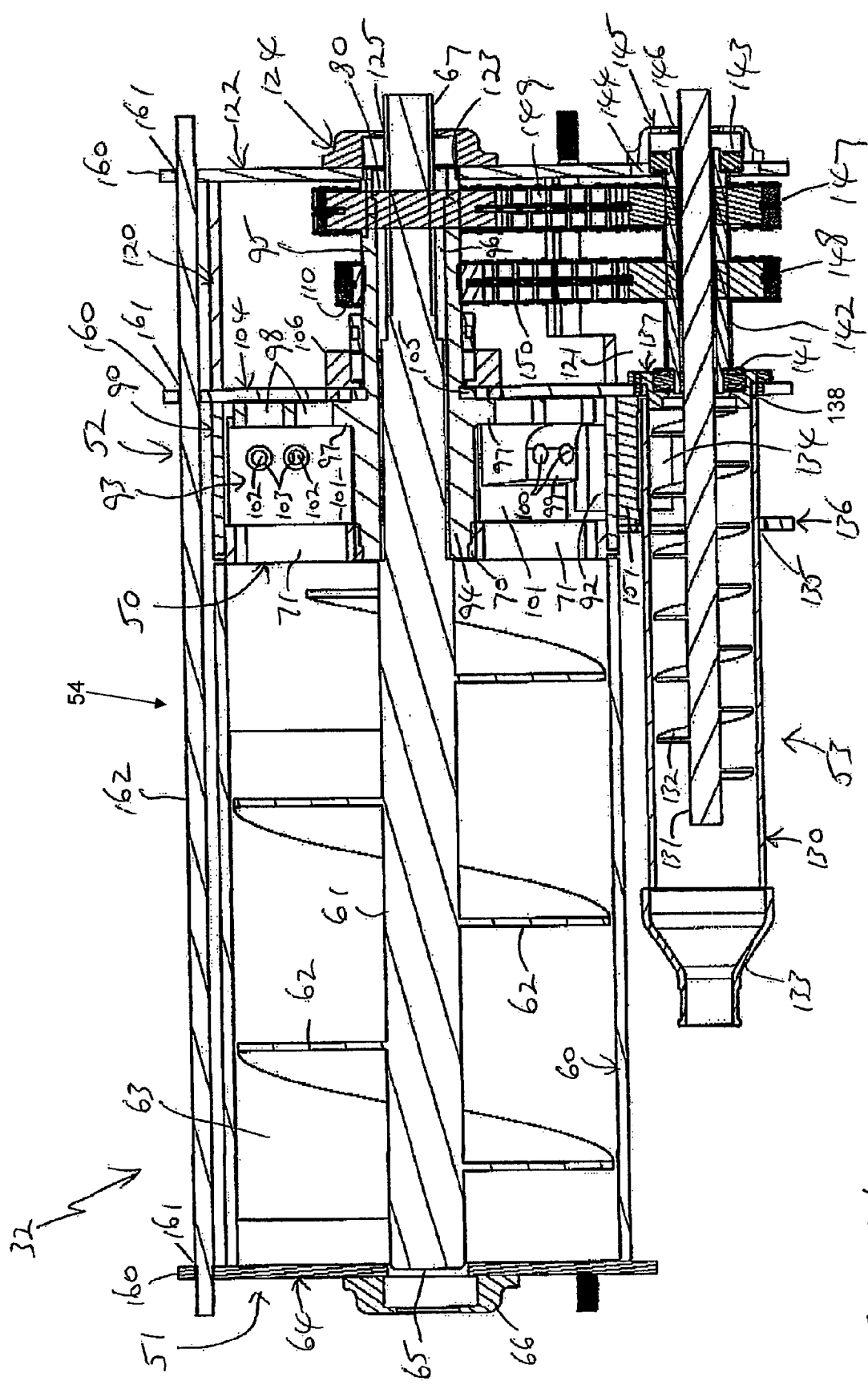
FIG. 4 is a longitudinal cross-sectional side view of the macerating and pumping unit depicted in FIG. 3.

Referring to FIGS. 1 and 2, an apparatus 30 for applying matter to a field includes a vessel in the form of a hopper 31 for storing matter such as rough compost, animal manure, or charcoal, for example.

A macerating and pumping apparatus/unit 32 is located at the bottom of the hopper 31.

An end of a drive shaft 33 is connected to the macerating and pumping unit 32 such that unit 32 is able to be driven by rotating the drive shaft 33 about its longitudinal axis. The other end of the drive shaft 33 is connectable to a power take-off of a vehicle (not depicted) such as a tractor which tows the apparatus 30. The power take-off of the vehicle is able to rotate the drive shaft 33 such that the shaft 33 rotates about its longitudinal axis.

The hopper 31 and the macerating and pumping unit 32 are mounted on a frame 34 that includes a plurality of longitudinal members 35 and a plurality of lateral members 36 that extend between and that are secured to the longitudinal members 35.

An A-frame drawbar 37 extends from a front end of the frame 34. Drawbar 37 is used to couple the apparatus 30 to a towing vehicle. Drawbar 37 includes a pair of convergent members 38 and a tongue 39 that extends from the members 38 and that is located at the apex of the drawbar 37. Tongue 39 includes an opening 40 for receiving a tow ball, tow pin or the like of the towing vehicle.

Apparatus 30 also includes a pair of rotatable wheels 41 secured relative to the frame 34. In addition to supporting the apparatus 30 on a ground surface, the wheels 41 also facilitate traversal of the apparatus 30 across the surface of the field.

Apparatus 30 also includes a ground-engaging tool in the form of a deep ripper leg 42 that includes a point at a lower end thereof. A mounting bracket 43 is secured to a rear end of the frame 34. A pair of parallel arms 44 extends from the leg 42 to the bracket 43, and a pair of cross members 45 extends between the arms 43. The arms 44 are able to pivot relative to the leg 42, bracket 43 and cross members 45. Leg 42 is able to be lowered to a ground-engaging position by pivoting the arms 44 downwardly relative to the bracket 43. Leg 42 is able to be raised from the ground-engaging position by pivoting the arms 43 upwardly relative to the bracket 43.

A pipe 46 is connected to the macerating and pumping unit 32. Pipe 46 extends over the top of the bracket 43, arms 44, and leg 42 and along the rear of the leg 42 so that an outlet 47 of the pipe 46 is located adjacent to the bottom of the leg 42.

The macerating and pumping unit 32 is able to macerate the matter stored in the hopper 31 into a slurry and to pump the slurry through the pipe 46 so that the slurry is discharged from the outlet 47. Alternatively, if the matter stored in the hopper 31 does not include a sufficient amount of liquid to enable the macerating and pumping unit 32 to macerate the matter into a slurry, the unit 32 is able (with the addition of liquid, if necessary) to macerate the matter into an extrudable form/consistency, and is able to pump the macerated matter through the pipe 46 such that the matter is extruded from the outlet 47.

Referring to FIGS. 3 to 6, the macerating and pumping unit 32 includes: a macerating plate 50; an auger 51 for forcing the matter stored in the hopper 31 through the macerating plate 50; an agitating pump 52 for pumping the slurry into the hopper 31, and a discharge pump 53 for pumping the slurry through the pipe 46 so that the slurry is discharged from the outlet 47. A macerator 54 of the macerating and pumping unit 32 comprises the macerating plate 50 and the auger 51.

Auger 51 includes a cylindrical housing 60 containing a shaft 61 from which a broad helical flange 62 extends. An upper portion of the housing 60 includes a pair of openings 63 that allow material in the hopper 31 to fall in to the auger 51. An end plate 64, which adjoins the housing 60, is located at one end of the shaft 61. End plate 64 includes an opening 65 that receives an end of the shaft 61 such that the shaft 61 is able to rotate about its longitudinal axis relative to the end plate 64. Opening 65 is sealed by a cover 66 that is secured to the end plate 64. Shaft 61 also includes a splined end 67 that includes a plurality of spaced ridges 68.

The macerating plate 50 includes a central opening 70 that receives the shaft 61 such that the shaft 61 is able to rotate about its longitudinal axis relative to the plate 50, and such that the helical flange 62 is located between the plate 50 and the end plate 64. Plate 50 includes a plurality of openings 71 through which the auger 51 is able to force matter from the hopper 31.

The joint between the housing 60 and the end plate 64; and the joint between the housing 60 and the macerating plate 50 are sealed to prevent matter from leaking out of the auger 51 from between the housing 60 and the end plate 64, or between the housing 60 and the macerating plate 50.

A gear or sprocket 80 is mounted on the shaft 61 such that each ridge 68 fits inside a corresponding groove (not depicted) in the hub of the gear 80 so that the gear 80 is able to transmit torque to the shaft 61.

Agitating pump 50 is a vane pump that includes a generally cylindrical housing 90. An upper portion of the housing 90 includes a pair of openings 91, and a lower portion of the housing 90 includes an opening 92. The macerating plate 50 is received by an adjacent end of the housing 90.

Pump 50 also includes a rotor 93 that is located inside the housing 90. Rotor 93 includes a hub 94 and a shaft 95 extending from the hub 94. A circular opening 96 extends through the centre of the hub and the shaft 95. The opening 96 receives the auger shaft 61 such that the rotor 93 is able to rotate relative to the shaft 61 about the axis of rotation of the shaft 61.

Rotor 93 also includes a flange 97 that extends from the hub 94 and that is contained within the housing 90. A plurality of circumferentially-spaced pairs of circular openings 98 extend through the flange 97, and a plurality of circumferentially-spaced and radially-extending formations 99 project from the flange 97. Each formation 99 includes a pair of threaded openings 100

Rotor 93 also includes a plurality of vanes in the form of macerating blades 101. Each blade 101 includes a pair of threaded openings 102. Each blade 101 is secured to a respective formation 99 by a pair of grub screws 103. Each grub screw 103 is screwed into a respective opening 100 and a respective opening 102.

The macerating blades 101 extend from closely adjacent to the flange 97 to closely adjacent the macerating plate 50. In addition, they also extend from closely adjacent the hub 94 to closely adjacent the housing 90.

An end plate 104, which adjoins the housing 90, is located on an opposite side of the housing 90 to the macerating plate 50. End plate 104 includes an opening 105 through which the shaft 95 extends. A collar 106 prevents slurry and other matter that is contained in the housing 90 from leaking out of the housing 90 between the shaft 95 and the end plate 104.

Shaft 95 extends through a hub (not depicted) of a gear or sprocket 110, and is secured to the gear or sprocket 110 such that the gear or sprocket 110 is able to transmit torque through to the shaft 95.

An end of a cylindrical housing 120 abuts against the end plate 104. A lower portion of the housing 120 includes an opening 121. An end plate 122 covers the other end of the housing 120. End plate 122 includes an opening 123 that receives an end of the shaft 95 such that the shaft 95 is able to rotate relative to the end plate 122. A cover 124 is secured to the end plate 122. Cover 124 includes an opening 125 through which the splined end 67 of the shaft 61 extends.

Discharge pump 53 includes a cylindrical housing 130 containing a shaft 131 from which a broad helical flange 132 extends. A nozzle 133 is secured to one end of the housing 130. Although not shown in the drawings, nozzle 133 is connected to the pipe 46. Housing 130 includes an opening 134 that is located adjacent an opposite end of the housing 130 to the nozzle 133.

Housing 130 extends through a circular opening 135 in a support plate 136. A collar 137 is received by the housing 130 and is secured to the housing 130 such that the collar 137 is unable to rotate relative to the housing 130. Collar 137 is received by a circular opening 138 in the end plate 104 such that the collar 137 is able to be rotated relative to the end plate 104. Collar 137 includes a projection 139 through which an opening 140 extends. Helical flange 132 extends from adjacent the collar 137 to an end of the shaft 131 that is adjacent to the nozzle 133.

A bearing 141 is received by the collar 137, and an end of a hollow shaft 142 is received by the bearing 141. The other end of the shaft 142 is received by a bearing 143. A circular opening 144 in the end plate 122 receives the bearing 143. Shaft 131 extends through the centre of the hollow shaft 142 which is secured to the shaft 131 such that torque is able to be transmitted from the hollow shaft 142 to the shaft 131. A cover 145 that includes an opening 146 is secured to the end plate 122 such that the shaft 131 extends through the opening 146. In addition to being received by the opening 144 in the end plate 122, the bearing 143 is received by the cover 145.

Hollow shaft 142 extends through the hub of a gear or sprocket 147 and the hub of a gear or sprocket 148, and is secured to the gears/sprockets 147, 148 such that the shaft 142 is able to transmit torque through to the gears/sprockets 147, 148. Gear/sprocket 147 is coupled to gear/sprocket 80 by an endless drive chain 149. Gear/sprocket 148 is coupled to gear/sprocket 110 by an endless drive chain 150.

A rubber seal 151, which includes an opening 152, is located between the pump housing 90 and the housing 130. Seal 151 extends around the perimeter of the opening 92 in the housing 90, and forms a seal between the housing 90 and the housing 130.

End plates 64, 104, 122 and support plate 136 include a plurality of projections 160. Each projection 160 includes a circular opening 161. A plurality of cylindrical rods 162 extend through the openings 161 in the projections 160. The ends of the rods 162 are threaded, and a plurality of nuts (not depicted) are wound on to the threaded rod ends and are tightened to thereby secure various components of the macerating and pumping unit 32 together.

Figure 5:
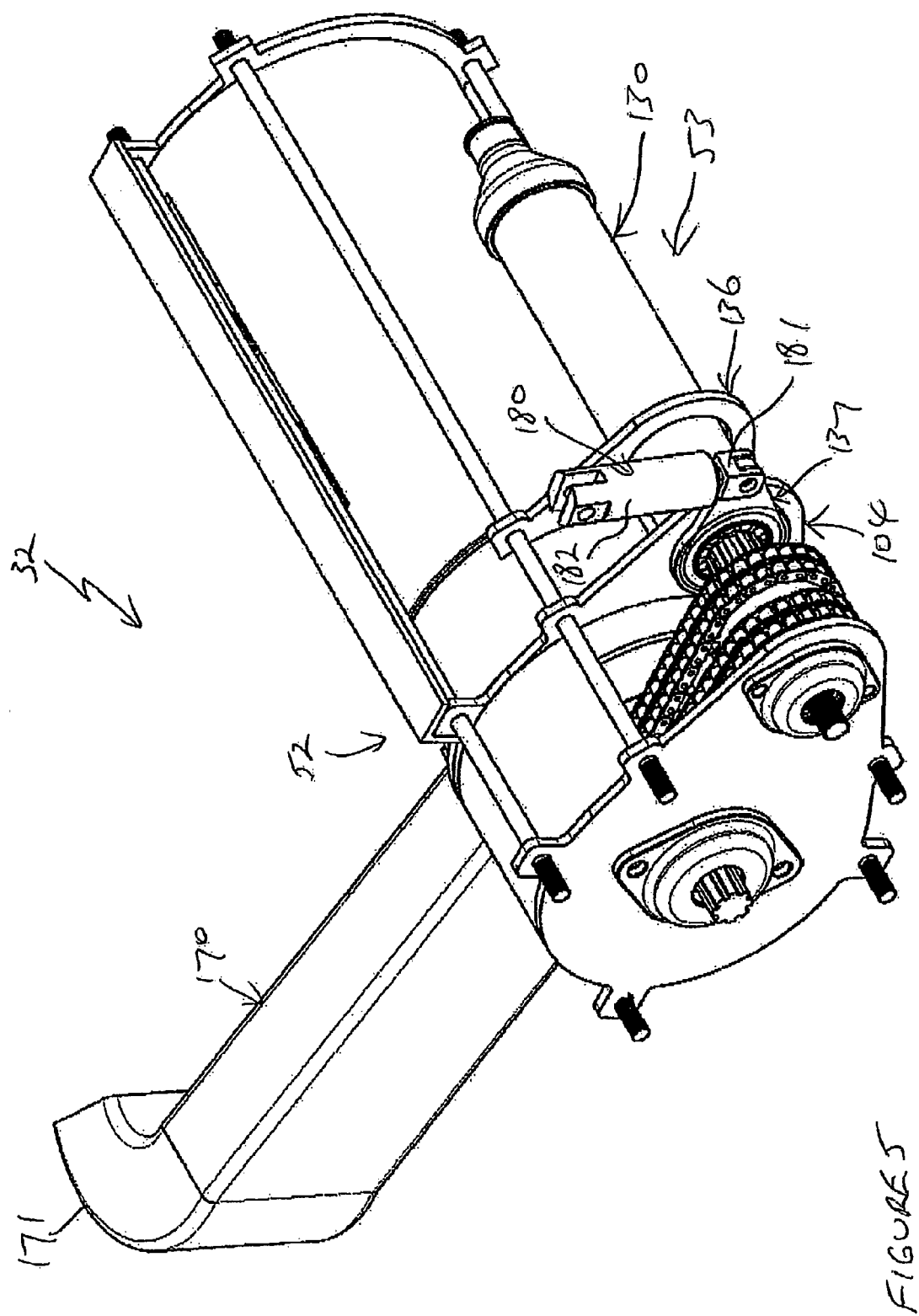
FIG. 5 is a perspective view of the macerating and pumping unit depicted in FIG. 3 which shows a chute of the unit.

With particular reference to FIG. 5, a chute 170 extends from and is secured to the pump housing 90 so that slurry that exits the agitating pump 52 through the openings 91 also passes through the chute 170 before being discharged into the hopper 31 from a curved end 171 of the chute 170.

Unit 32 also includes a hydraulic cylinder 180. A piston rod 181 of the cylinder 180 is pivotally secured to the projection 139 of the collar 137. Rod 181 is connected to a piston (not depicted) which is received by a cylinder barrel 182 of the cylinder 180.

Figure 6:
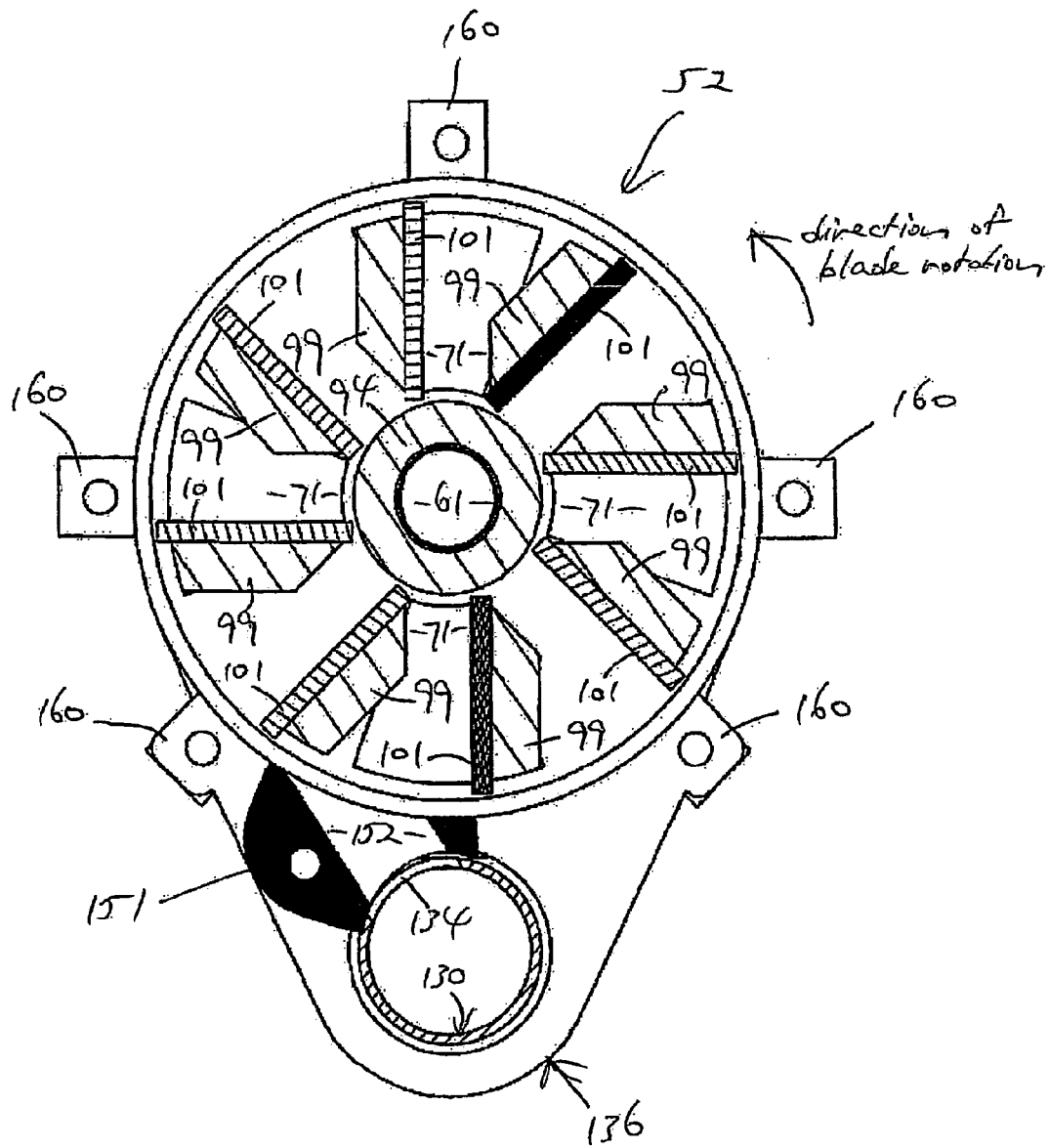
FIG. 6 is a lateral cross-sectional view of the macerating and pumping unit depicted in FIG. 3 which shows how the agitating pump is able to be connected to the discharge pump of the unit so that matter is able to pass from the agitating pump to the discharge pump.

Cylinder barrel 182 is secured relative to the unit 32 such that extension and retraction of the piston rod 181 rotates the collar 137 and, hence, the housing 130 relative to the end plate 104 and the support plate 136. With reference to FIG. 6, by extending and retracting the piston rod 181, the housing 130 is rotated such that the opening 134 in the housing 130 is aligned with the opening 152 in the seal 151, or such that the opening 152 is sealed by the housing 130. When the openings 134 and 152 are aligned, the agitating pump 52 is able to pump slurry out of the pump housing 90 through the opening 92 and into the housing 130 through the openings 152 and 134. When the openings 134 and 152 are not aligned so that the opening 152 is sealed by the housing 130, slurry is unable to be pumped into the housing 130 by the agitating pump 52.

In use, the apparatus 30 is hitched to a towing vehicle such as a tractor that includes a power take-off. Apparatus 30 is hitched to the towing vehicle such that the opening 40 in the tongue 39 receives a towing peg, pin, or similar which is secured to the towing vehicle. The free end of the drive shaft 33 is secured to the power take-off of the vehicle so that the power take-off is able to drive the macerating and pumping unit 32 by rotating the drive shaft 33. The other end of the drive shaft 33 is secured to the shaft 131 so that rotation of the shaft 33 causes the shaft 131 to rotate.

The hopper 31 is filled with the matter that is to be applied to a field by the apparatus 30. For example, the hopper 31 may be filled with rough compost or animal manure. In addition, water or another suitable liquid is poured or otherwise placed in the hopper 31. The amount of liquid that is placed in the hopper 31 may be sufficient so that the liquid and the solid matter stored in the hopper 31 are able to be processed into a slurry. Alternatively, as mentioned previously, the amount of liquid may be insufficient to allow the solid matter stored in the hopper 31 to be processed into a slurry, but may be sufficient to enable the processed matter to be extruded from the outlet 47.

Rotation of the drive shaft 33 by the power take-off of the towing vehicle rotates the discharge pump shaft 131 which in turn rotates the helical flange 132 and the hollow shaft 142. Rotating the hollow shaft 142 rotates the gears/sprockets 147, 148 which in turn causes the drive chains 149 and 150 to travel around the gears/sprockets 80 and 110, respectively, which in turn rotates the gears/sprockets 80, 110. Rotating gear/sprocket 80 rotates the auger shaft 61 which in turn rotates the helical flange 62. Rotating gear/sprocket 110 rotates the shaft 95 which in turn rotates the rotor 93 of the agitating pump 52.

The rate at which the discharge pump shaft 131 is rotated is the same as the rate at which the drive shaft 33 is rotated by the power take-off of the towing vehicle. The rate at which the auger shaft 61 is rotated depends on the rate at which the discharge pump shaft 131 is rotated as well as the ratio of the gears/sprockets 80 and 147. The rate at which the agitating pump rotor 93 is rotated depends on the rate at which the discharge pump shaft 131 is rotated as well as the ratio of the gears/sprockets 110 and 148. The gear ratios are selected so that the auger shaft 61 and the agitating pump rotor 93 are rotated at the correct rate. Typically, shaft 61 will be rotated at a slower rate than the rotor 93 so that the agitating pump 52 is not overwhelmed by matter that has been forced through the macerating plate 50 by the auger 51.

As the shaft 61 rotates, the matter and liquid contained in the hopper 31 are drawn into the auger housing 60 through the openings 63. The rotating helical flange 62 mixes together the matter and liquid in the housing 60, and also progressively moves it towards the macerating plate 50, and forces it through the openings 71 in the plate 50. Forcing the matter through the macerating plate openings 71 has the effect of grinding the matter-into smaller pieces. Further grinding of the matter is accomplished by the rotating blades 101 of the agitating pump 52 as the matter exits from the openings 71. The ground matter in combination with the liquid, assuming there is a sufficient amount of the latter, form a slurry.

The rotating blades 101, which also function as the vanes of the agitating pump 52, propel the matter through the openings 91 in the pump housing 90 and through the chute 170 (if present) so that the matter is discharged into the hopper 31.

If the hydraulic cylinder 180 has been operated so that the agitating pump housing opening 92, seal opening 152 and discharge pump housing opening 134 are aligned, at least some of the matter in the agitating pump housing 90 is propelled through the aligned openings 92, 152, 134 and into the discharge pump housing 130. Matter in the discharge pump housing 130 is progressively moved towards the nozzle 133 and through the pipe 46 by the rotating helical flange 132 so that the matter is discharged from the pipe outlet 47 at the rear of the apparatus 30.

Before the apparatus 30 is towed behind the towing vehicle so that the apparatus 30 traverses the field that the matter contained in the hopper 31 is to be applied to, the ripper leg 42 is lowered to the ground-engaging position by pivoting the arms 44 downwardly relative to the bracket 43. In the ground-engaging position, the lower portion of the ripper leg 42 penetrates into the ground to the desired depth.

The apparatus 30 is then towed behind the towing vehicle so that the apparatus 30 traverses the field that the matter contained in the hopper 31 is to be applied to. As the apparatus 30 traverses the field, the ripper leg 42 tills the ground by ripping it to the desired depth. Also, the macerating and pumping unit 32 is driven by the power take-off of the towing vehicle so that the matter is discharged/extruded from the pipe outlet 47 into or onto the tilled ground. In particular, the matter is discharged/extruded under pressure into the rip or furrow that is formed in the ground by the ripper leg 42.

The depth of penetration of the ripper leg 42 into the ground can be adjusted so that the ground is tilled to the desired depth, and so that the matter is deposited to the desired depth as well.

Apparatus 30 may also include means for incorporating measured amounts of seed, minerals, nutrients, microbes, bio-char and the like into the matter that is discharged/extruded from the outlet 47.

Apparatus 30 is particularly suitable for use in breaking-up hardpan as the ripper leg 42 is able to break-up the hardpan mechanically, and the matter that is deposited into the broken-up or tilled soil is able to amend the soil so as to inhibit the hardpan from reforming.

Figure 7:
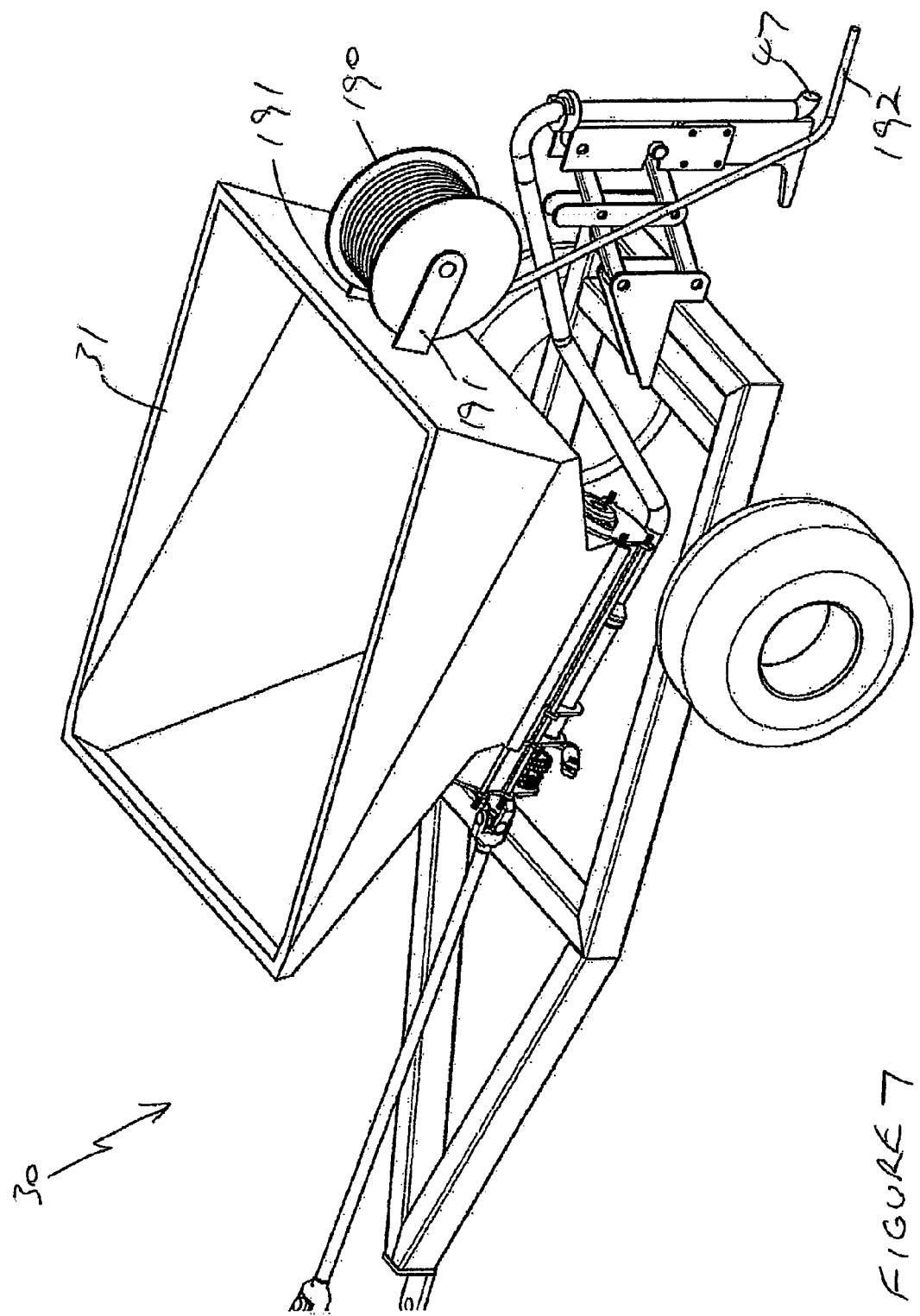
FIG. 7 is a perspective view of a modified version of the apparatus depicted in FIG. 1 which has a reel for dispensing a water drip pipe.
Figure 8:
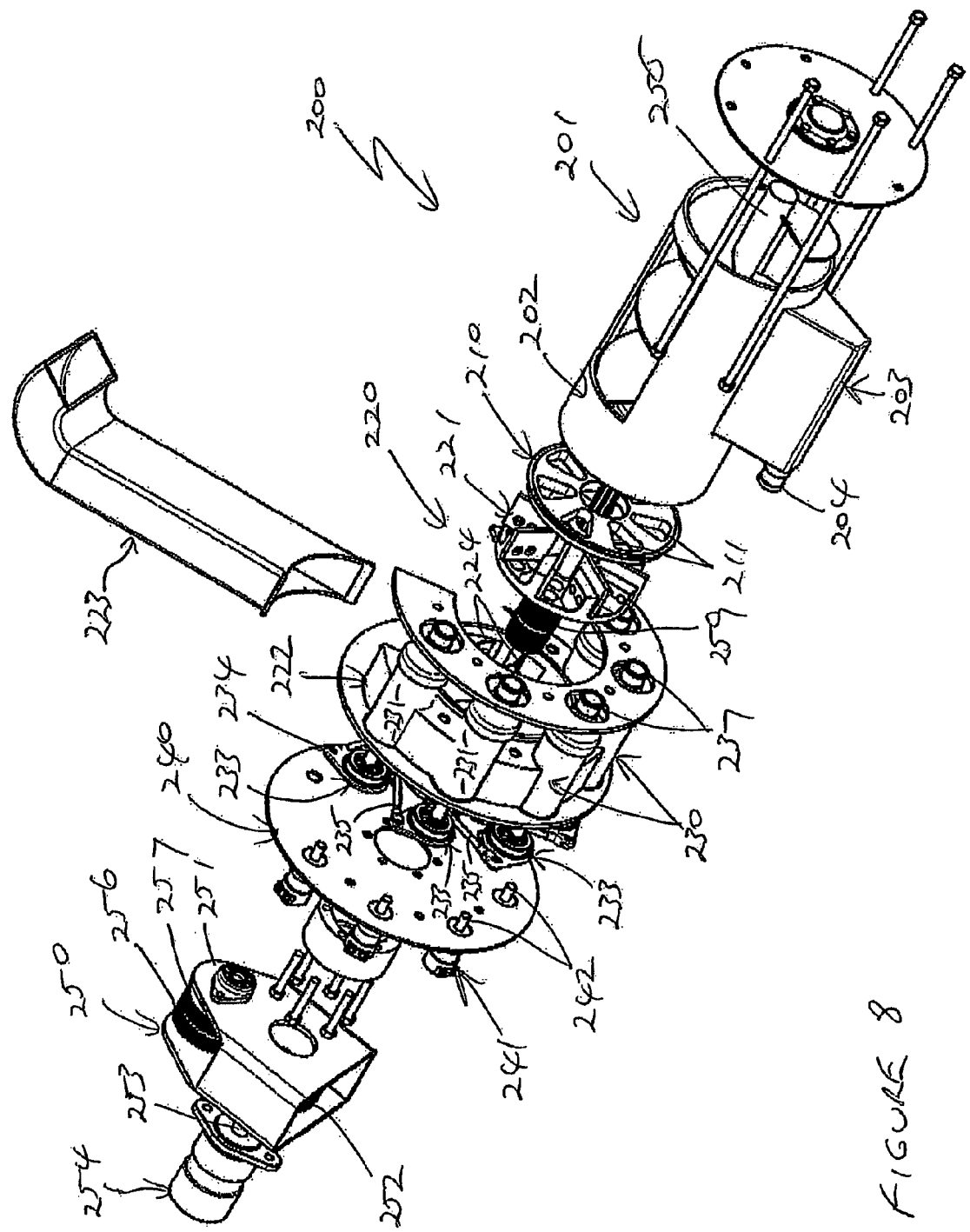
FIG. 8 is an exploded perspective view of an alternative macerating and pumping unit of the apparatus depicted in FIG. 1.
Figure 9:
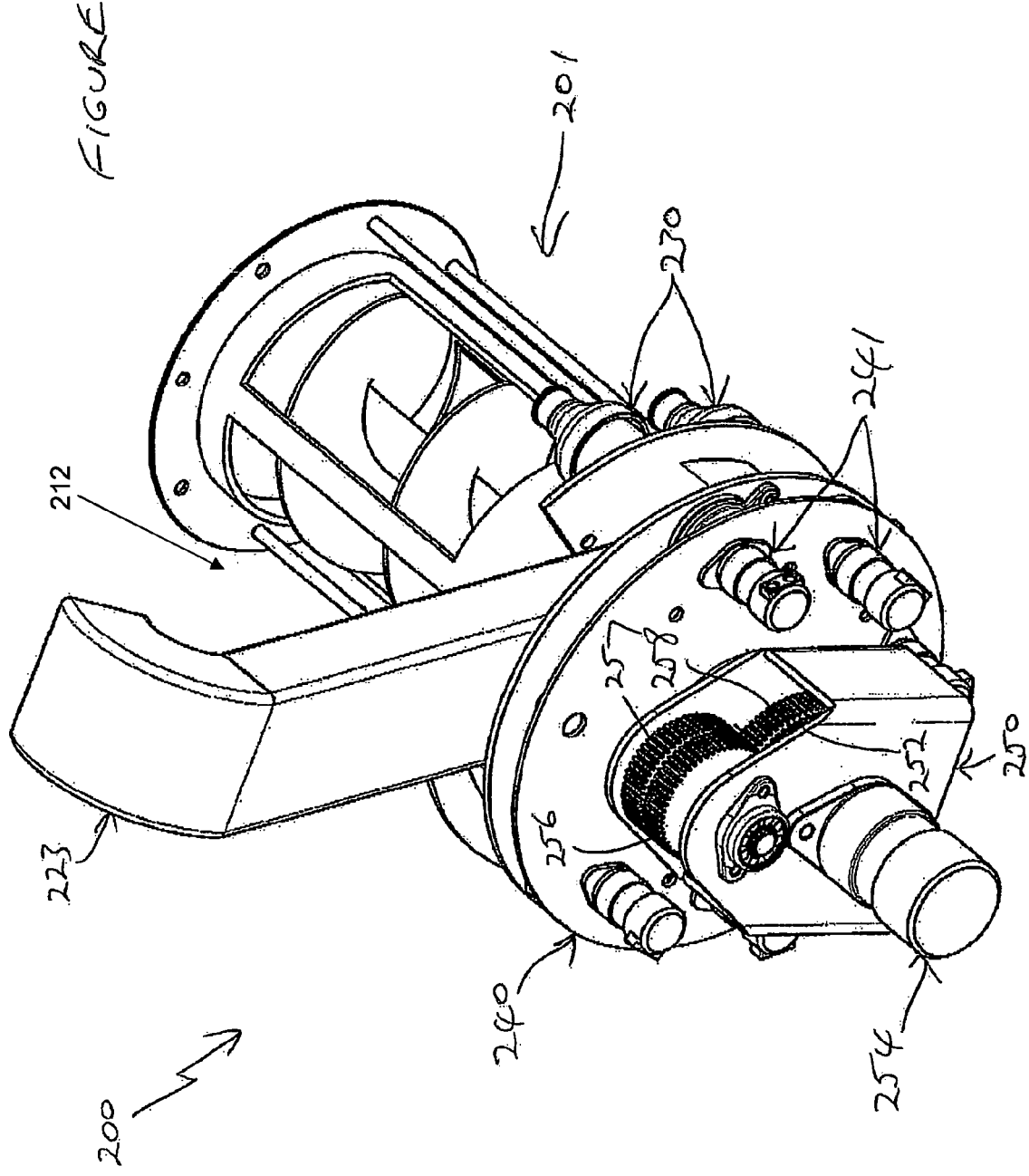
FIG. 9 is a perspective view of the assembled alternative macerating and pumping unit depicted in FIG. 8.
Figure 10:
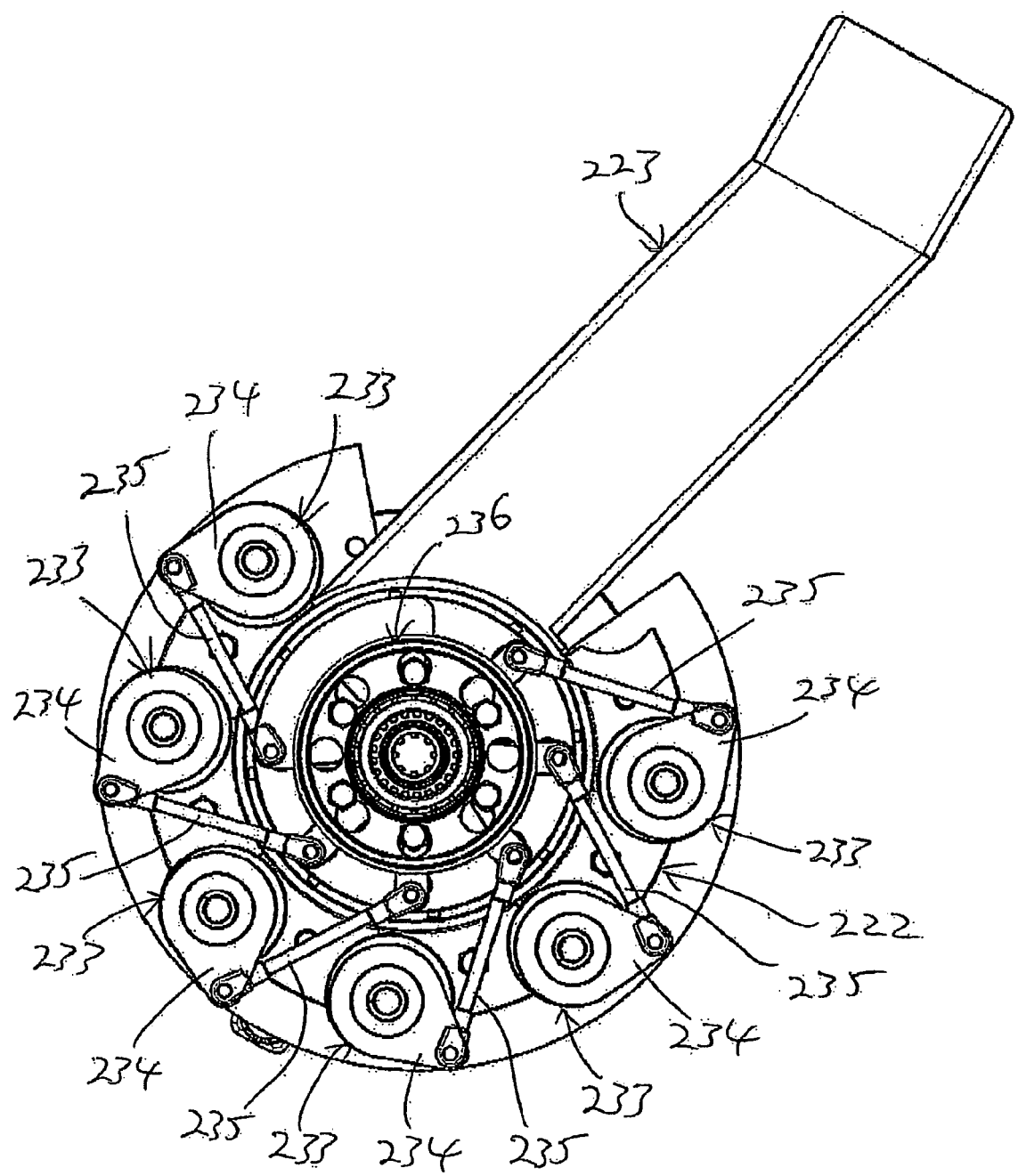
FIG. 10 is a lateral cross-sectional view of the alternative macerating and pumping unit depicted in FIG. 8 which shows the mechanism for connecting the agitating pump to each of the discharge pumps of the unit so that matter is able to pass from the agitating pump to each of the discharge pumps.
Figure 16:
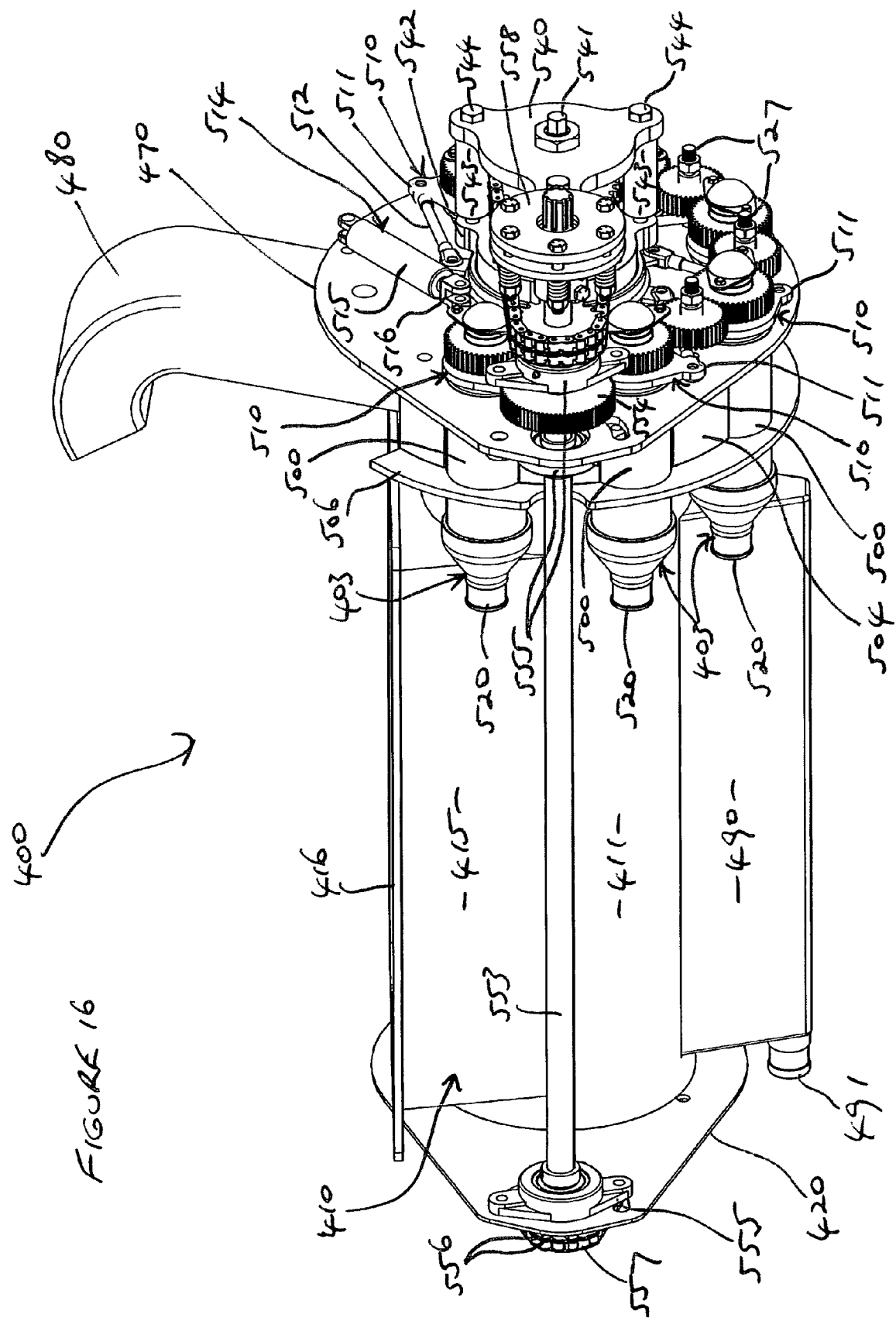
FIG. 16 is a first perspective side view of the macerating and pumping unit depicted in FIG. 15.
Figure 17:
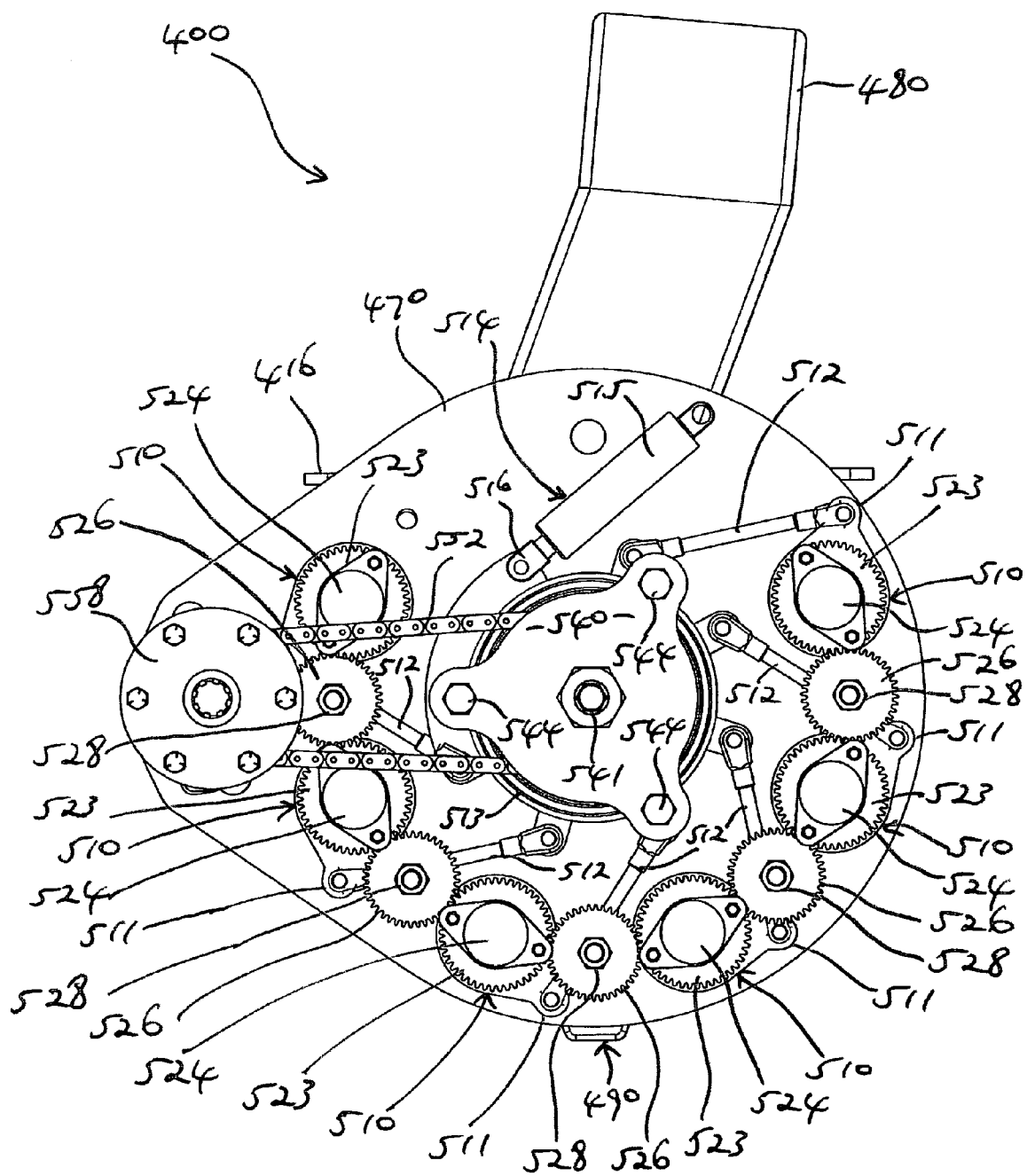
FIG. 17 is an end view of a first end of the macerating and pumping unit depicted in FIG. 15.
Figure 18:
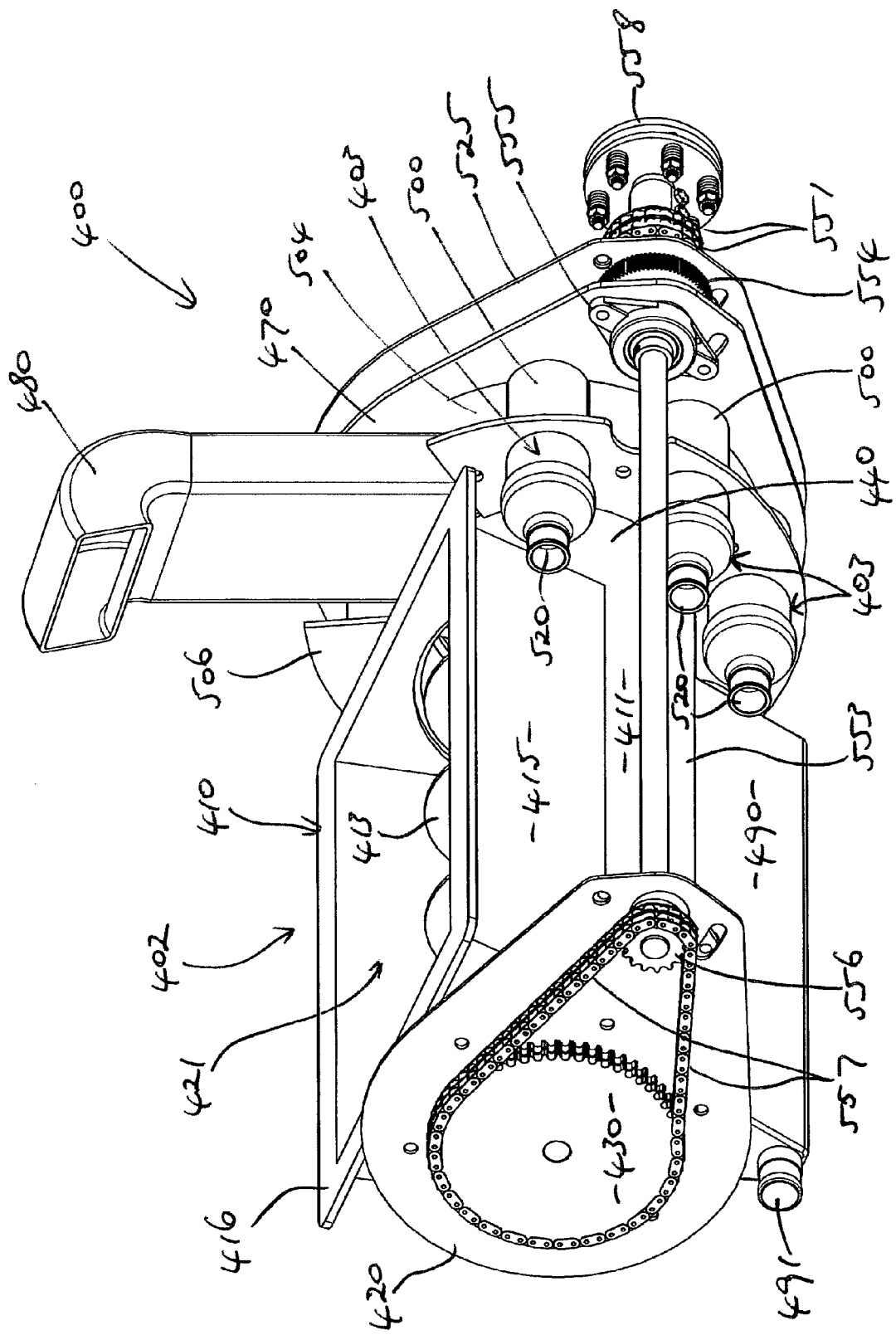
FIG. 18 is a second perspective side view of the macerating and pumping unit depicted in FIG. 15.
Figure 19:
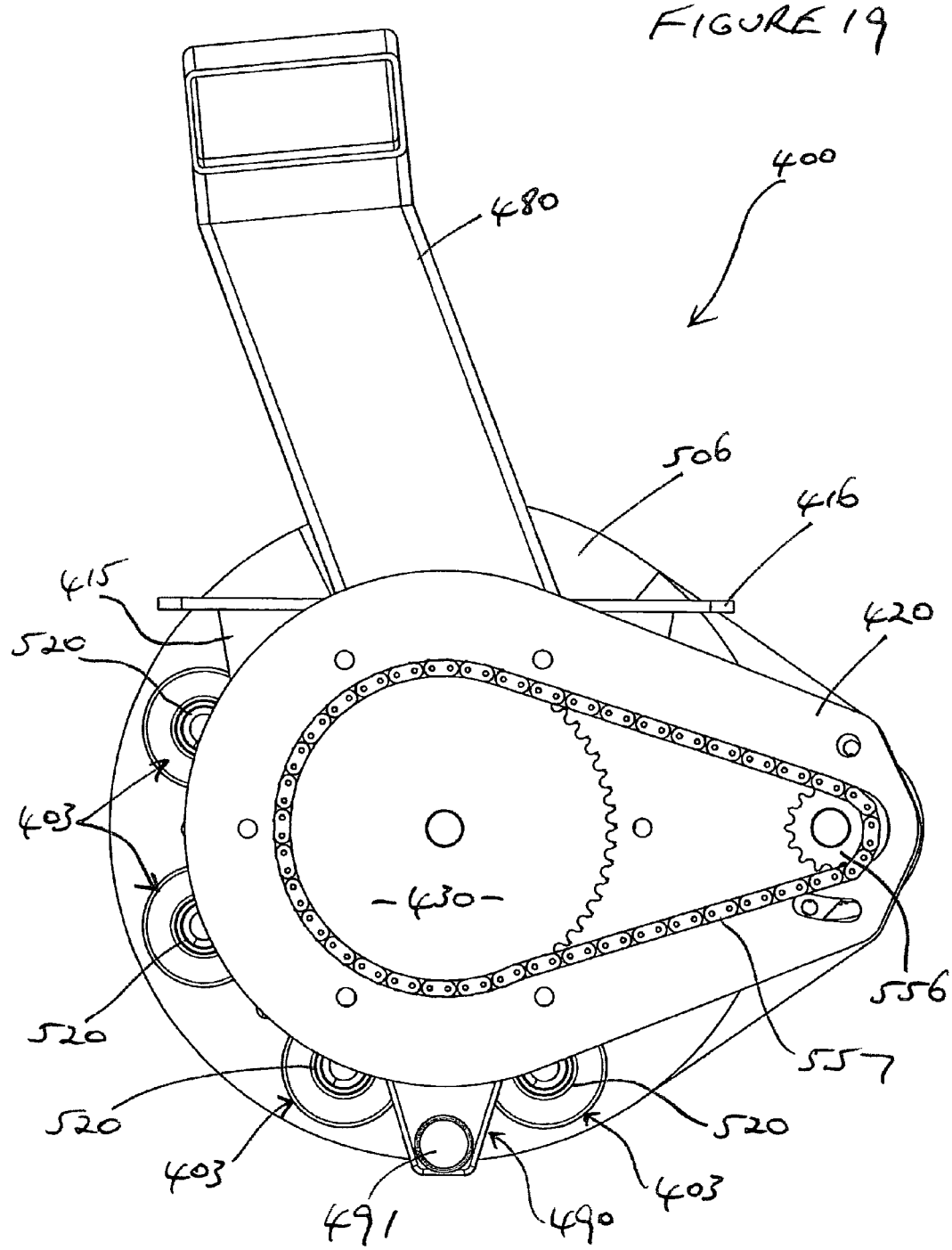
FIG. 19 is an end view of a second end of the macerating and pumping unit depicted in FIG. 15.
Figure 20:
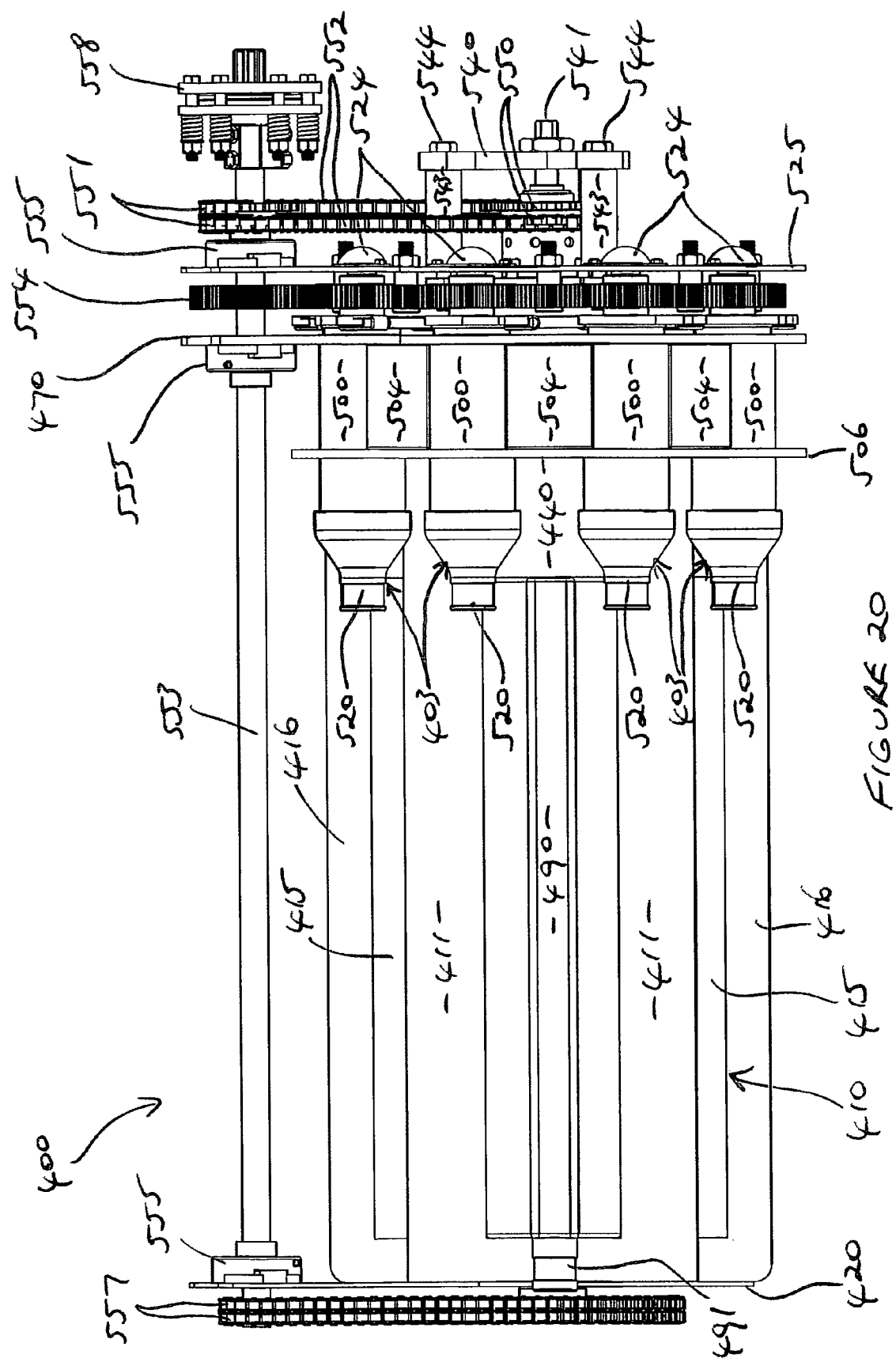
FIG. 20 is a bottom plan view of the macerating and pumping unit depicted in FIG. 15.
Figure 21:
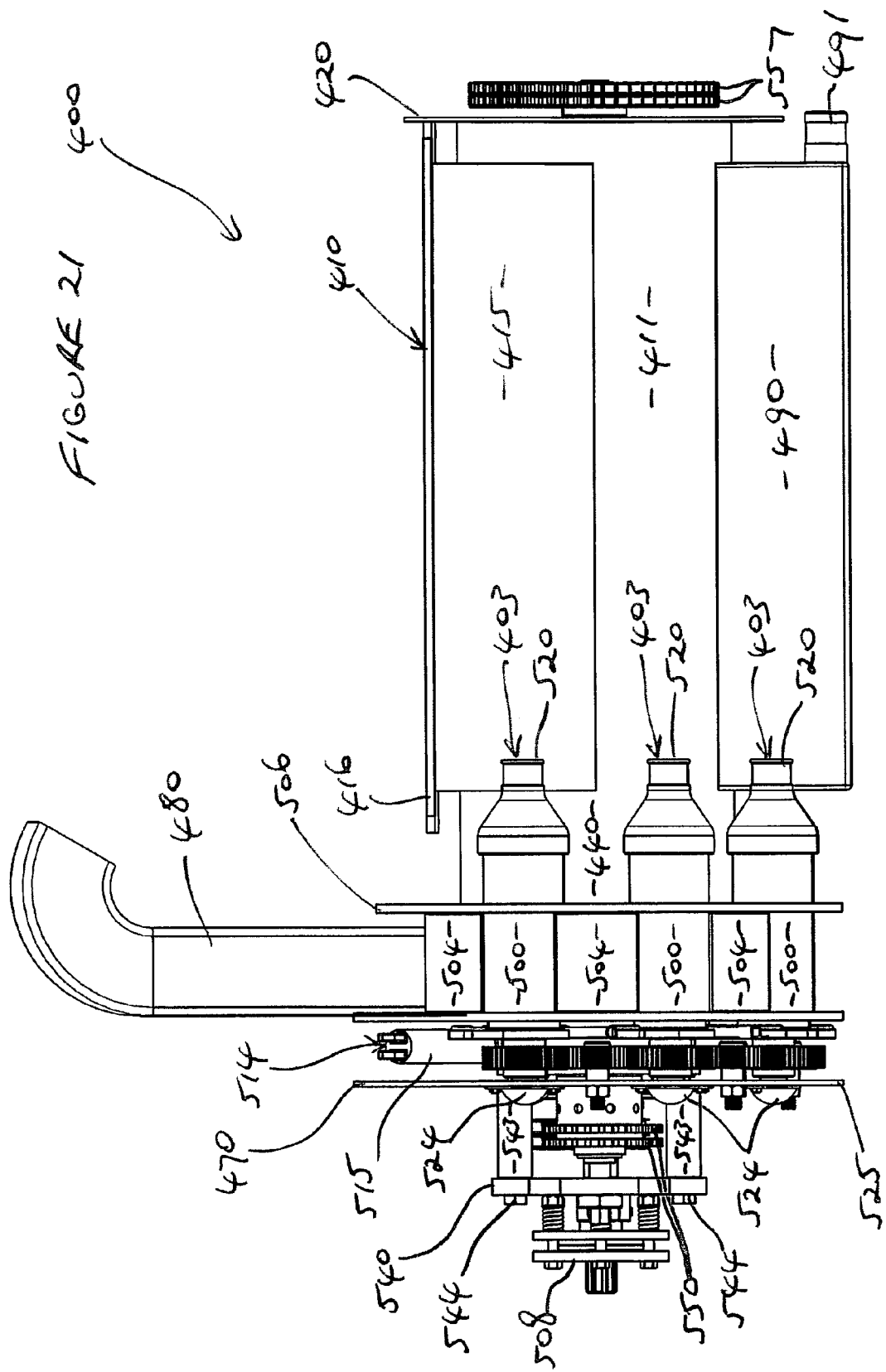
FIG. 21 is a side view of the macerating and pumping unit depicted in FIG. 15.
Figure 22:
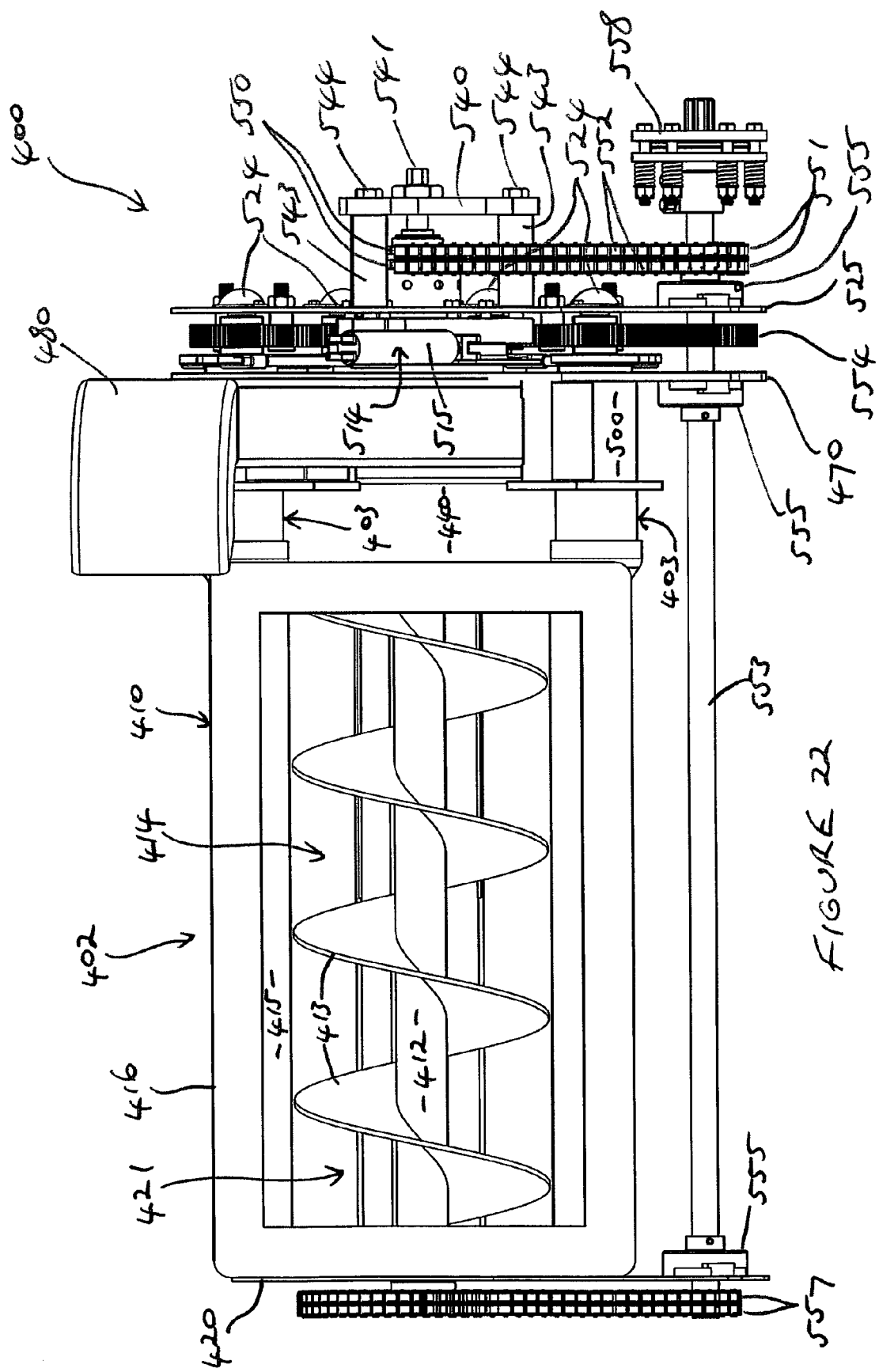
FIG. 22 is a plain view of the macerating and pumping unit depicted in FIG. 15.
Figure 23:
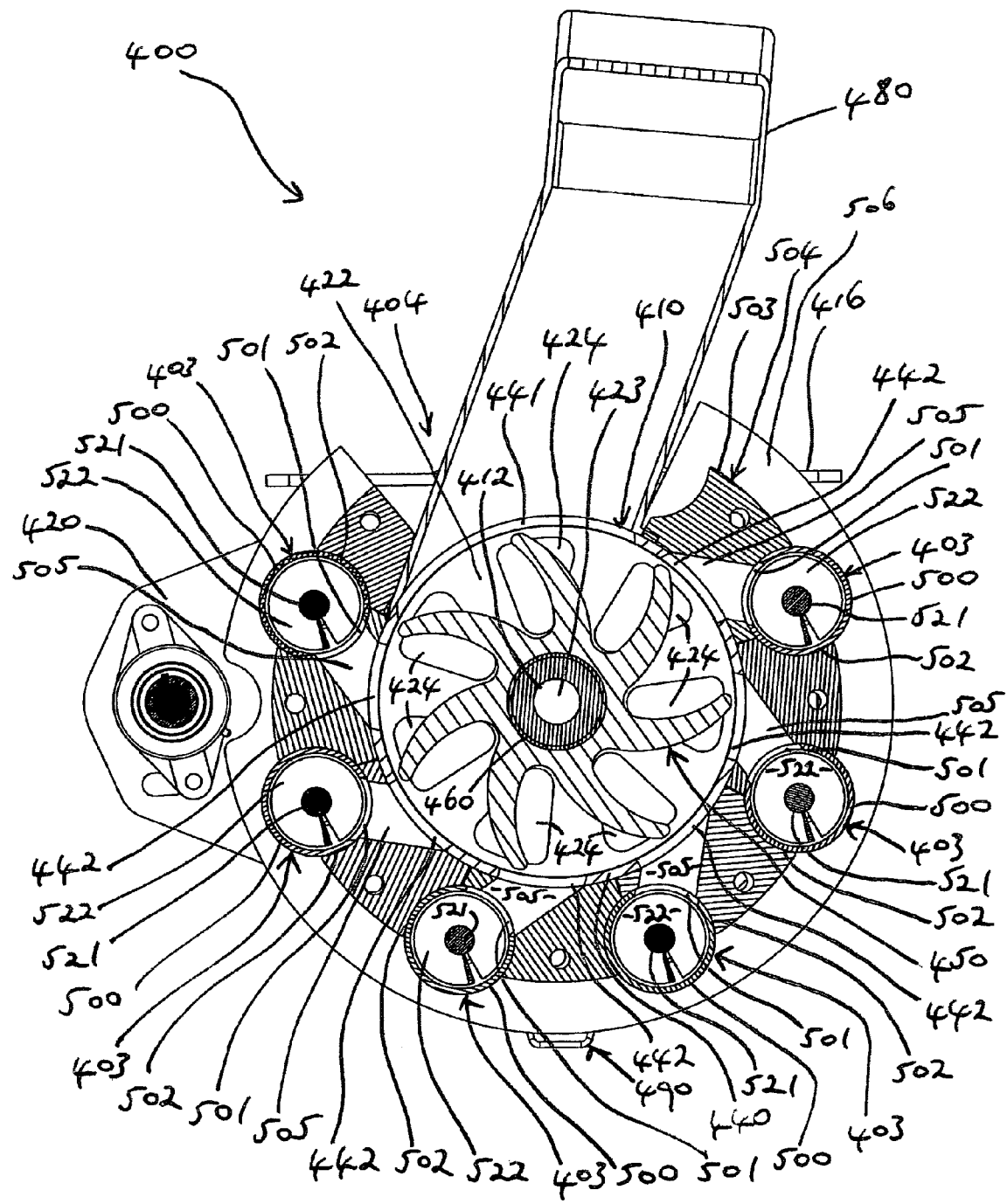
FIG. 23 is a lateral cross-sectional view of the macerating and pumping unit depicted in FIG. 15 which shows how the agitating pump is able to be connected to each of the discharge pumps of the unit so that matter is able to pass from the agitating pump to each of the discharge pumps.
Figure 24:
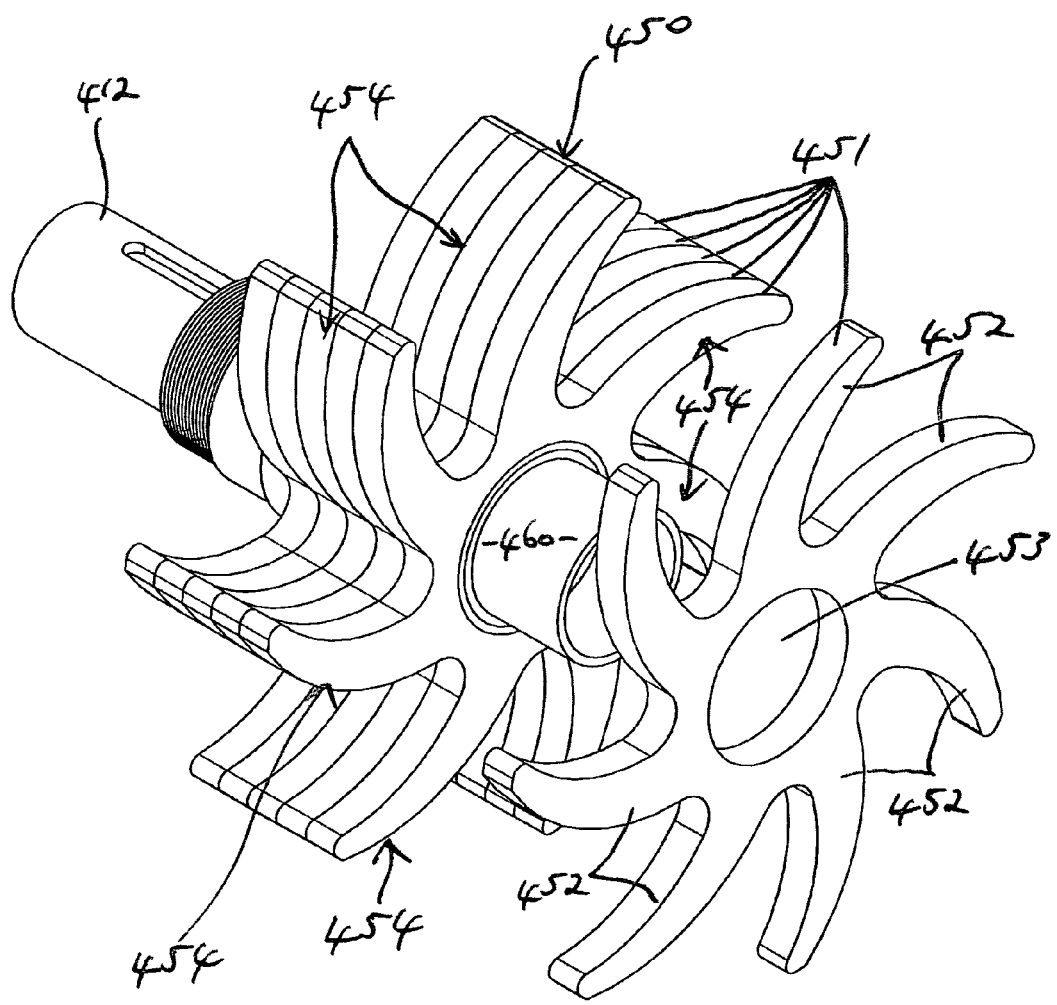
FIG. 24 is a perspective view of a partially assembled rotor of the macerating and pumping unit depicted, in FIG. 15.

With reference to FIG. 7, apparatus 30 may also include a rotatable reel 190 which is supported by a pair of brackets 191 that extend from the rear of the hopper 31. A water drip pipe 192 which is wound on to the reel 190 is able to be drawn from the reel 190 and laid alongside the matter that is discharged/extruded from the outlet 47.

Referring to FIGS. 8 to 11, instead of the macerating and pumping unit/apparatus 32, apparatus 30 may include an alternative macerating and pumping unit/apparatus 200.

Unit 200 includes an auger 201 which is similar to the auger 51. However, unlike the auger 51, a housing 202 of the auger 201 includes a stone trap 203 for trapping stones and other hard objects that may enter the housing 202. Stone trap 203 includes a nozzle 204 for connecting to a water supply so that water is able to flow into the housing 202 through the stone trap 203 and mix with the solid matter in the housing 202.

A macerating plate 210 of the unit 200 is similar to the macerating plate 50 of the unit 32 except that there are more openings 211 in the plate 210 than there are openings 71.

A macerator 212 of the macerator and pumping unit/apparatus 200 comprises the auger 201 and the macerating plate 210.

An agitating pump 220 of the unit 200 is similar to the agitating pump 52 of unit 32. Pump 220 includes a rotor 221 and a housing 222 that receives the rotor 221. A chute 223 is mounted on the housing 222 such that the rotor 221 is able to propel slurry/matter out of the housing 222 through openings (not depicted) in an upper portion of the housing 222, and through the chute 223. Housing 222 also includes six openings 224.

Six discharge pumps 230 are secured relative to the housing 222. Each pump 230 is similar to the discharge pump 53 of the macerating and pumping unit 32. A cylindrical housing 231 of each pump 230 is able to be rotated relative to the housing 222. The housing 231 of each pump 230 includes an opening 232 that is able to be selectively aligned with a corresponding opening 224 in the housing 222 by rotating the housing 231 relative to the housing 222. When the opening 232 in the housing 231 is aligned with a corresponding opening 224 in the housing 222, the agitating pump 220 is able to pump slurry/matter out of the pump housing 222 through the aligned openings 224, 232 and into the housing 231. The housing 231 of each pump 230 is also able to be rotated so that the opening 224 is sealed by the housing 231, and so that slurry/matter is thereby prevented from being pumped into the housing 231 by the agitating pump 220.

Each discharge pump 230 includes a collar 233 that is received by the pump housing 231 and that is secured to the housing 231 such that the collar 233 is unable to rotate relative to the housing 231. The collar 233 is also received by a circular opening (not depicted) in the pump housing 222 such that the collar 233 is able to be rotated relative to the housing 222. The collar 233 includes a projection 234, and an end of an arm 235 is secured to the projection 234 such that the arm 235 is able to pivot relative to the collar 233. The other end of the arm 235 is secured to a rotor 236 such that the collar 233 and, hence, the housing 231 that the collar 233 is secured to, is able to be rotated by rotating the rotor 236 so that the agitating pump 220 is permitted or inhibited from pumping slurry/matter into the housing 231.

Each discharge pump 230 also includes a nozzle 237 for connecting to a respective pipe 46 of the apparatus 30. The outlet 47 of each pipe 46 may, for example, be positioned adjacent to a lower end of a respective ripper leg 42.

In addition, each discharge pump 230 includes a shaft 238, and a helical flange 239 extending from the shaft 238.

Unit 200 also includes a support plate 240 on which is mounted a respective hydraulic motor 241 for driving each discharge pump 230. Each motor 241 includes a drive shaft 242 that extends through the collar 233 of the discharge pump 230 that is driven by the motor 241. The drive shaft 242 is coupled to the shaft 238 of the discharge pump 230 so that the pump shaft 238 is able to be rotated by the motor 241.

A gearbox 250 is secured relative to the support plate 240. Gearbox 250 includes a housing 251 that contains a gear 252 that is mounted on a shaft 253 of a hydraulic motor 254 so that torque is able to be transmitted from the shaft 253 to the gear 252. The shaft 253 is connected directly to a shaft 255 of the auger 201 so that shaft 255 rotates at the same rate as the shaft 253. Gear 252 meshes with a gear 256 so that rotation of gear 252 causes gear 256 to rotate. Gear 252 is mounted on a common shaft (not depicted) with a gear 257 so that rotation of the gear 256 transmits torque through to the shaft which in turn transmits torque through to the gear 257. Gear 257 meshes with a gear 258 so that rotation of gear 257 causes gear 258 to rotate. Gear 258 is mounted on a shaft 259 of the agitating pump rotor 221 so that torque is able to be transmitted from the gear 258 to the shaft 259 and, hence, the rotor 221.

The rate of rotation of the rotor 221 is a function of the rate of rotation of the motor shaft 253, and the ratio of the gears 252, 256, 257, 258. Typically, the gears 252, 256, 257, 258 are selected so that the rotor 221 rotates at a faster rate than the auger shaft 255 so that the agitating pump 220 is not overwhelmed by matter that is forced through the macerating plate 210 by the auger 201.

The hydraulic motors 241, 254 may be powered by a hydraulic system of the towing vehicle.

Another alternative macerating and pumping unit/apparatus 300 for the apparatus 30 is depicted in FIG. 12 along with an alternative ground-engaging tool mounting assembly 320 for the apparatus 30.

Macerating and pumping unit 300 is similar in operation to the macerating and pumping unit 32. The construction and operation of the macerating and pumping unit 300 will therefore not be described here in detail.

Assembly 320 includes a pair of mounting brackets 321 for securing the assembly 320 relative to the frame 34 of the apparatus 30. Each bracket 321 includes a pair of elongate plates 322, a lower base plate 323 secured to each of the plates 322, and an upper base plate 324 secured to each of the plates 322. Each of the base plates 323, 324 has a plurality of holes 325 to allow the base plates 323, 324 to be bolted to the frame 34.

A respective hollow cylindrical pivot member 326 extends between and is secured relative to the elongate plates 322 of each mounting bracket 321. Referring also to FIGS. 13 and 14, a hollow cylindrical spigot 327 extends from an opening (not depicted) in the side wall of the pivot member 326. Slurry/matter is able to flow/pass into the interior of the pivot member 326 through the spigot 327 and the opening. Another opening (not depicted) in the side wall of the pivot member 326 is located opposite the first-mentioned opening in the side wall so that slurry/matter that flows/passes into the pivot member. 326 through the spigot 327 and the first-mentioned opening is able to flow out of the pivot member 326 through that other opening.

A respective support bracket 328 is secured to each of the mounting brackets 321 such that the support brackets 328 are able to pivot relative to the mounting brackets 321. Each support bracket 328 includes a pair of L-shaped plates 329 which are secured to each other by a shaft 330 which extends through the pivot member 326 of one of the mounting brackets 321 such that the support bracket 328 is able to pivot relative to that mounting bracket 321.

The support brackets 328 are biased to pivot downwardly relative to the mounting bracket 321 by hydraulic cylinders 340. Each hydraulic cylinder 340 includes a cylinder barrel 341 which is hinged to a respective one of the mounting brackets 321 by a pair of shafts 342 extending from opposite sides of the barrel 341. A piston rod 343 of each cylinder 340 is secured to a respective shaft 344, and the shafts 344 are secured relative to the support brackets 328 such that the shafts 344 are able to pivot relative to the brackets 328.

A respective ground-engaging tool in the form of a ripper tyne 350 is secured to each support bracket 328 by a plurality of bolts 351 which extend through openings in the tyne 350 and each L-shaped plate 329 of the bracket 328 which the tyne 350 is secured to. The bolts 351 are fastened to the support brackets 328 by a respective nut 352 screwed onto each end of each bolt 351.

An outlet nozzle (not depicted) of the discharge pump 53 of the macerating and pumping unit 300 is connected to the spigot 327 of at least one of the pivot members 326 by a short length of pipe/hose 360 so that slurry/matter which is pumped out of the nozzle of the discharge pump 53 is able to flow/pass through the pipe 360 and each of the pivot members 326 which the pipe/hose 360 is connected to.

A respective pipe 370 is secured to each of the support brackets 328. A lower end of each pipe 370 includes an opening (not depicted) so that end is able to function as the outlet 47 of the apparatus 30. An upper end of each pipe 370 includes an opening (not depicted) so that end is able to function as an inlet 371 of the pipe 370. To enable the pipes 370 to pivot about the pivot members 326, the upper ends of the pipes 370 include a curved bearing 372 which is in bearing engagement with the cylindrical outer surfaces of the pivot members 326.

The openings in the upper ends of the pipes 370 align with the openings in the pivot members 326 which are located on the opposite side of the pivot members 326 to the spigots 327. This allows slurry/matter to flow/pass from the pivot members 326 through the pipes 370 and out of the outlets 47 so that, the slurry/matter is deposited into or onto the ground which has been tilled by the ripper tynes 350.

The ripper tynes 350 are biased to a ground-engaging position by the hydraulic cylinders 340 so that the piston rods 343 are extended from the cylinder barrels 341. A hydraulic accumulator (not depicted) is connected to the cylinders 340. The accumulator is charged with nitrogen to maintain pressure inside the cylinder barrels 341 so that the piston rods 343 are extended relative to the barrels 341.

If, while the apparatus 30 with the assembly 320 installed is traversing a field, one or more of the ripper tynes 350 comes into contact with an object (e.g. a rock) in the ground that won't give, the force exerted by the object against the ripper tyne 350 will cause the support bracket 328 of the affected tyne 350 as well as the tyne 350 itself and the associated pipe 370 to all pivot upwardly about the associated pivoting axle/shaft 330 so that the tyne 350 is raised. This upward pivoting movement in turn causes the piston rod 343 of the associated hydraulic cylinder 340 to retract into the cylinder barrel 341 of that cylinder 340. This arrangement enables the affected ripper tyne 350 to pass over the object. Once the tyne 350 has passed over the object, the biasing force exerted by the cylinder 340 on the support bracket 328 will again cause the tyne 350 to be lowered into the ground to the maximum extent. The ground-engaging tool mounting assembly 320 therefore provides a hydraulic breakout capability for the ripper tynes 350.

Employing the mechanism/assembly 320 allows the length of the pipe/hose 360 to be minimised. This is advantageous because the longer the pipe that the slurry/matter needs to pass through, the more difficult it is to pump the slurry/matter. Thus, reducing or minimising the length of the pipe/hose 360 assists in reducing the difficulty in pumping the slurry/matter through that pipe/hose 360.

Also, mechanism/assembly 320 allows the ripper tynes 350 to be raised and lowered without affecting the pipe/hose 360 or the pipe 370 by bending, crimping or kinking the pipe/hose 360 or the pipe 370.

Moreover, as depicted in FIG. 14, pipe 370 can be easily removed for blockage removal and cleaning purposes.

In addition, employing the mechanism/assembly 320 simplifies the design of the apparatus 30 insofar as the plumbing between the discharge pump 53 and the ripper tyne 350 is concerned.

Mechanism/assembly 320 is not limited to employing ripper tynes 350 as the ground-engaging tools of the apparatus 30 on which the mechanism/assembly 320 is mounted. For example, the mechanism/assembly 320 may use cultivator discs, scarifier points, or the like instead of, or in combination with, the ripper tynes 350.

Another alternative macerating and pumping unit/apparatus 400 that the apparatus 30 may include instead of the macerating and pumping unit/apparatus 32, 200 is depicted in FIGS. 15 to 24.

FIG. 15 depicts the macerating and pumping unit 400 with a hopper 401 mounted on it. Hopper 401 is different to the hopper 31 of the apparatus 30.

An end of the drive shaft 33 of the apparatus 30 is connected to the macerating and pumping unit 400 such that the unit 400 is able to be driven by rotating the drive shaft 33. The other end of the drive shaft 33 is connectable to a power take-off of a vehicle (not depicted) such as a tractor that tows the apparatus 30.

The macerating and pumping unit 400 and the hopper 401 are, in use, mounted on the frame 34 of the apparatus 30 in a similar manner to the way in which the macerating and pumping unit 32 is mounted on the frame 34.

The macerating and pumping unit 400 is able to macerate matter that is stored in the hopper 401, and is also able to pump the macerated matter out of the unit 400 such that the macerated matter is then able to be extruded from a plurality of outlets (not depicted) that are connected to the unit 400. The macerated matter is able to be extruded from the outlets into or onto a tilled field.

The macerating and pumping unit 400 includes a macerator 402 for macerating matter that is stored in the hopper 401. Unit 400 also includes a plurality of discharge pumps 403 for pumping the macerated matter out of the unit 400 such that the matter is pumped from the aforementioned outlets as an extrusion. In addition, unit 400 includes an agitating pump 404 for pumping the macerated matter into the hopper 401 or to the discharge pumps 403 so that the discharge pumps 403 can then pump it to the outlets from which the macerated matter is extruded.

Macerating and pumping unit 400 includes a housing 410 that forms part of both the macerator 402 and the agitating pump 404. Housing 410 includes a first cylindrical section 411 that contains an elongate and rotatable shaft 412 from which a broad helical flange 413 extends.

An upper portion of the first cylindrical section 411 includes an opening 414, and a tapered rectangular duct section 415 extends upwardly from the opening 414. A flange 416 extends around the perimeter of an upper end of the duct section 415. A flange 417 of the hopper 401 rests on top of, and is secured to, the flange 416. Material/matter that is stored in the hopper 401 is able to fall into the first cylindrical section 411 through the tapered duct section 415 and the opening 414.

An end plate 420, which adjoins the housing 410, is located at one end of the shaft 412. End plate 420 includes an opening that receives an end of the shaft 412 such that the shaft 412 is able to rotate about its longitudinal axis relative to the end plate 420. The opening in the end plate 420 that receives the end of the shaft 412 is sealed so that matter is thereby prevented from leaking out of the housing 410 between the shaft 412 and the end plate 420.

An auger 421 of the macerator 402 includes the first cylindrical section 411 of the housing 410, as well as the shaft 412, and the helical flange 413 that are located inside that section of the housing 410.

In addition to the auger 421, the macerator 402 also includes a macerating plate 422. The macerating plate 422 is located at an opposite end of the first cylindrical section 411 to the end plate 420. The macerating plate 422 includes a central opening 423 that receives the shaft 412 such that the shaft 412 is able to rotate about its longitudinal axis relative to the plate 422. Plate 422 also includes a plurality of generally triangular openings 424 through which the auger 421 is able to force matter that finds its way into the first cylindrical section 411.

The joint between the housing 410 and the macerating plate 422 is sealed to prevent matter from leaking out of the auger 421 from between the housing 410 and the macerating plate 422.

A pair of sprockets 430 is mounted on the shaft 412 such that rotation of the sprockets 430 causes the shaft 412 and the helical flange 413 to rotate about the longitudinal axis of the shaft 412, and vice versa.

Agitating pump 404 is a vane pump that includes a second cylindrical section 440 of the housing 410. An upper portion of the second cylindrical section 440 includes an opening 441, and a plurality of circumferentially spaced openings 442 also extend through the section 440. The macerating plate 422 is located between the first cylindrical section 411 and the second cylindrical section 440.

Pump 404 also includes a rotor 450 that includes a plurality of 16 mm thick steel plates 451. Each plate 451 includes a plurality of outwardly radiating curved arms 452, and a central circular opening 453. The plates 451 are stacked or positioned side by side such that the arms 452 form rotor vanes 454 of the pump 404. The leading edges of the arms 452 of the plate 451 that is closest to the macerating plate 422 are able to function as cutting edges and are able to cooperate with the macerating plate 422 to cut through material or matter that is forced through the macerating plate 422 by the auger 421.

The order of the plates 451 can be rearranged so as to change the particular plate 451 that is located closest to the macerating plate 422. This may be done, for example, when the cutting edges of the plate 451 that is located closest to the macerating plate 422 become dull and it is consequently necessary to replace that plate 451 with another one of the plates 451 that has sharper cutting edges so as to maintain the cutting performance of the rotor 450. Thus, constructing the rotor 450 to include a plurality of steel plates 451 that are stacked or positioned side by side in the manner just described allows for easy access for servicing and maintenance of the plates 451 and the macerating plate 422.

The pump 404 also includes a, hollow shaft 460 that receives the auger shaft 412 such that the two shafts 412, 460, are able to rotate independently of each other. The steel plates 451 of the rotor 450 are mounted on the shaft 460 such that, when the shaft 460 is rotated, the plates 451 rotate with the shaft 460.

An end plate 470, which adjoins the housing 410, is located at an opposite end of the shaft 460 to the macerating plate 422. End plate 470 includes an opening that receives an end of the shaft 460 such that the shaft 460 is able to rotate about its longitudinal axis relative to the end plate 470. The opening in the end plate 470 that receives the end of the shaft 460 is sealed so that matter is thereby prevented from leaking out of the housing 410 between the shaft 460 and the end plate 470.

A chute/riser tube 480 is mounted on the housing 410 such that the rotor 450 is able to propel slurry/matter out of the second cylindrical section 440 of the housing 410 and into the hopper 401 through both the opening 441 in the upper portion of the second cylindrical section. 440 and the chute 480.

The housing 410 includes a stone trap 490 for trapping stones and other hard objects that may enter the housing 410. Stone trap 490 includes a nozzle 491 for connecting to a water supply so that water is able to flow into the housing 410 through the stone trap 490 and mix with the solid matter in the housing 410.

There are six discharge pumps 403 secured relative to the housing 410. The pumps 403 are similar to the pump 230 of the macerating and pumping unit 200. Each pump 403 includes a cylindrical housing 500 that includes an opening 501. Each pump housing 500 rests in a corresponding cylindrical recess 502 in an outer surface 503 of a hollow cylindrical support member 504 that surrounds the second cylindrical section 440 of the housing 410. A plurality of passages 505 in the support member 504 extend between the openings 442 and the recesses 502. The support member 504 is secured to a circular rib or flange 506 that is secured relative to the housing 410, and through which the housings 500 extend.

The cylindrical housing 500 of each discharge pump 403 is able to be rotated about, it longitudinal axis relative to the housing 410, support member 504, and the flange 506. The opening 501 in the housing 500 of each pump 403 is able to be selectively aligned with a corresponding opening 442 in the housing 410, and a corresponding passage 505 in the support member 504 by rotating the housing 500 about its longitudinal axis relative to the housing 410. When the opening 501 in the housing 500 is aligned with a corresponding opening 442 in the housing 410, and a corresponding passage 505 in the support member 504, the agitating pump 404 is able to pump matter out of the second cylindrical section 440 of the housing 410 and into the housing 500 through the aligned openings 442, 501 and passage 505. The housing 500 of each discharge pump 403 is also able to be rotated about its longitudinal axis so that the opening 442 and the passage 505 is sealed by the housing 500, and so that matter is thereby prevented from being pumped into the housing 500 by the agitating pump 404.

Each discharge pump 403 includes a collar 510 that is secured relative to the housing 500 of the pump 403 such that the collar 510 is unable to rotate relative to the housing 500, and such that the collar 510 rotates with the housing 500 as the housing 500 is rotated relative to the housing 410, support member 504, and the flange 506. Each collar 510 includes a lobe or projection 511, and an end of a respective linkage or arm 512 is secured to the projection 511 of each collar 510 such that the arm 512 is able to pivot relative to the collar 510. The other end of each arm 512 is secured to a rotor 513 such that the collars 510 and, hence, the housings 500 that the collars 510 are secured to, are able to be rotated relative to the housing 410, support member 504, and the flange 506 by rotating the rotor 513 relative to the housing 410 so that the agitating pump 404 is thereby permitted or inhibited from pumping matter into the pump housings 500.

The length of each arm 512 can be adjusted to vary the degree to which the openings 501 of the various discharge pumps 403 are able to be aligned with the various openings 442 and passages 505. If the length of a particular arm 512 is adjusted so that the pump housing opening 501 that corresponds to that arm 512 is only able to be partially aligned with the opening 442 and passage 505 that are associated with that opening 501 when the rotor 513 is rotated to the maximum extent in the direction that will allow matter to be pumped from the agitating pump 404 to the discharge pumps 403, the rate of flow or passage of matter from the pump 404 to the discharge pump 403 that is associate with the particular arm will be less than if the pump housing opening 501 that corresponds to that arm 512 is fully aligned with the associated opening 442 and passage 505. Varying the degree to which the openings 501 are able to be aligned with the various, openings 442 and passages 505 therefore enables the rate at which matter is pumped by the various discharge pumps 403 to be controlled or regulated.

The rotor 513 is able to be rotated by a hydraulic or pneumatic cylinder 514. Cylinder 514 includes a barrel 515, a piston (not depicted) that is received by the barrel 515 such that the piston is able to slide back and forth within the barrel 515, and a piston rod 516 that is secured to the piston and that extends from an end of the cylinder 514. An end of the piston rod 516 is secured to the rotor 513 such that the rod 516 is able to pivot relative to the rotor 513, and a distal end of the barrel 515 is secured relative to a support such that the barrel 515 is able to pivot relative to the support. For example, the barrel 515 may be secured relative to the end plate 470. The piston rod 516 is able to be extended and retracted relative to the barrel 515. Extending the piston rod 516 relative to the barrel 515 rotates the rotor 513 in a first direction, and retracting the piston rod 516 relative to the barrel 515 rotates the rotor 513 in a second direction that is opposite to the first direction.

Each discharge pump 403 also includes a nozzle 520 for connecting to a respective pipe 46 of the apparatus 30. The outlet 47 of each pipe 46 may, for example, be positioned adjacent to a lower end of a respective ripper leg 42.

In addition, each discharge pump 403 includes a shaft 521, and a helical flange 522 that extends from the shaft 521. The shaft 521 and helical flange 522 of each discharge pump 403 are housed within the pump housing 500 of the pump 403 such that the shaft 521 and the helical flange 522 are able to be rotated inside the housing 500 about their longitudinal axes and the longitudinal axis of the housing 500.

A respective drive gear 523 is secured to each shaft 521 such that the gears 523 are able to rotate with the shafts 521 and relative to the collars 510. A respective bearing 524 supports each shaft 521 such that the shafts 521 are able to be rotated. Each bearing 524 is secured to a support plate 525.

A plurality of idler gears 526 engage or mesh with the drive gears 523 such that rotating one of the idler gears 526 or drive gears 523 rotates the other idler gears 526 and drive gears 523. Each idler gear 526 is mounted on a threaded shaft 527 that extends through an opening in the support plate 525, and that is secured to the support plate 525 by a nut 528 that is screwed on to the shaft 527.

The shaft 460 is supported by a support plate 540 to which a pump bearing preload screw 541 is secured. The support plate 541 is separated from a support plate 542 by a plurality of spacers 543 that are secured to the plates 541, 542 by screws/bolts 544.

A pair of sprockets 550 is mounted on the shaft 460 so that the sprockets are unable to, rotate relative to the shaft 460. The sprockets 550 are coupled to a pair of smaller sprockets 551 by a pair of endless drive chains 552 that are trained around the sprockets 550 and the sprockets 551. The sprockets 551 are mounted on a rotatable idler shaft 553 such that the sprockets 551 are unable to rotate relative to the shaft 553. A primary drive gear 554 is mounted on the idler shaft 553 such that the gear is unable to rotate relative to the shaft 533. Gear 554 engages or meshes with one of the idler gears 526 such that rotation of the gear 554 rotates that particular idler gear 526 which in turn rotates the other idler gears 526 and the drive gears 523. Shaft 553 extends through a plurality of bearings 555 such that the shaft 553 is able to rotate. The bearings 555 are secured to the end plates 420, 470 and the support plate 525. A pair of sprockets 556 is mounted on the shaft 553 such that the sprockets 556 are unable to rotate relative to the shaft 553. The sprockets 556 are coupled to the sprockets 430, which are larger than the sprockets 556, by a pair of endless drive chains 557 that are trained around the sprockets 430 and the sprockets 556 so that rotation of the sprockets 556 causes the sprockets 430 to rotate.

A clutch mechanism 558 of the macerating and pumping apparatus 400 is used to couple the idler shaft 553 to the drive shaft 33 of the apparatus 30 so that the shaft 553 can be driven by the drive shaft 33.

In use, the drive shaft 33 drives the idler shaft 553 through the clutch mechanism 558 so that the shaft 553 rotates about its longitudinal axis. The rotating shaft 553 rotates the sprockets 556 which cause the endless drive chains 557 to cycle or travel around the sprockets 430 so that the sprockets 430 rotate. The rotating sprockets 430 rotate the shaft 412 which rotates the helical flange 413 within the first cylindrical section 411 of the housing 410. The rotating flange 413 forces matter that enters the first cylindrical section 411 from the hopper 401 through the macerating plate 422.

The rotating shaft 553 also rotates the sprockets 551 which cause the endless drive chains 552 to cycle or travel around the sprockets 551 so that the sprockets 551 rotate. The rotating sprockets 551 rotate the shaft 460 which rotates the rotor 450 within the second cylindrical section 440 of the housing 410. As the rotor 450 rotates, the leading cutting edges of the arms 452 of the steel plate 451 that is closest to the macerating plate 522 cut through the matter that is forced through the macerating plate 422 by the rotating flange 413.

If the cylinder 514 is operated so that the openings 442 and passages 505 are sealed by the pump housings 500, the rotating rotor 450 forces the matter within the second cylindrical housing section 440 through the opening 441 and the chute 480 so that the matter is expelled or dumped into the hopper 401.

If the cylinder 514 is operated so that the openings 442, 501 and passages 505 are aligned, the rotating rotor 450 forces matter in the second cylindrical housing section 440 through the openings 442, 501 and passages 505, and into the pump housings 500 of the discharge pumps 403.

The rotating idler shaft 553 also rotates the primary drive gear 554 which in turn rotates one of the idler gears 526. Rotation of that idler gear 526 causes the other idlers gears 526 and the drive gears 523 to rotate. The rotating drive gears 523 rotate the shafts 521 of the discharge pumps 403 which in turn rotate the helical flanges 522 of the pumps 403 such that the flanges 522 force matter that is in the housings 500 out of the housings 500 through the nozzles 520. If the nozzles are each connected to a respective hose or pipe 46, the matter is forced through the pipes 46 until it is extruded from the outlets 47 of the pipes 46.

The ratios of the various gears 523, 526, 554 can be varied or changed to adjust the rate of rotation of one or more of the shafts 521 and flanges 522. Adjusting the rate of rotating of a shaft 521 and, hence, the flange 522 that extends from the shaft 521, will adjust the rate at which the discharge pump 403 which includes that shaft 521 and flange 522 is able to pump or expel matter for any given speed or rate of rotation of the idler shaft 553. Varying the ratios of the various gears 523, 526, 554 is accomplished by replacing one or more of the gears 523, 526, 554 with different-sized gears.

All of the macerating and pumping units that have been described are able to macerate matter, and to agitate the matter contained in the hopper that feeds the matter to the macerating and pumping unit by pumping the macerated matter back into the hopper.

Each macerating and pumping unit includes a large auger that is able to push the matter through a macerating plate of the unit. The macerated material/matter is able to be re-circulated back into a hopper that feeds the matter to the macerating and pumping unit. Re-circulating the matter in this way agitates or mixes the matter that is stored inside the hopper, and prevents or inhibits solid material in the matter that is stored in the hopper from settling towards the bottom of the hopper.

Initially, enough water is added to the hopper of the apparatus so that when the agitating pump of the macerating and pumping unit is started, the water is drawn from the hopper by the pump which then pumps or re-circulates the water back into the hopper through the chute of the macerating and pumping unit. Once the water is moving/being circulated in this manner, dry material such as compost or manure that, along with the water, will form the matter that is extruded by the apparatus, is added to the hopper as the macerating and pumping unit is running so that the matter/material flowing through the macerating and pumping unit is progressively macerated and mixed together.

In some instances, dry material alone may be placed in the hopper and macerated and mixed by the macerating and pumping unit. The macerated and mixed dry material may be pumped or extruded directly out of the nozzles of the discharge pumps rather than pumping/extruding it from the hoses/pipes that are connected to the discharge pump nozzles.

The macerated matter is re-circulated by the agitating pump until the mixture has the desired consistency. Once the macerated matter stored in the hopper has the desired consistency, the agitating pump of the macerating and pumping unit is able to pump/redirect the matter to the discharge pump or pumps of the macerating and pumping unit which then pump the matter through pipes that are connected to them so that the matter is discharged, expelled, or extruded from the outlets of the pipes.

The mixture that is pumped by the discharge pumps is quite dense, and there can be difficulties pumping it along a pipe, tube, or hose. The long pitch auger or screw propeller of the discharge pumps assists in maintaining the inertia or speed of the material leaving the vane pump as the flow of the mixture changes direction through 90 degrees as it flows from the agitating pump to the discharge pumps, and is then pumped through the pipes or hoses of the apparatus by the discharge pumps. This is not a positive displacement flow, but allows for coarser materials to be transported.

In the case where the discharge pumps of the macerating and pumping unit are progressive cavity pumps, the discharge pumps are able to provide a positive displacement of material flow. However, the progressive cavity pumps can be limited in their ability to transport coarse materials made up of sizable solid particles. The inclusion of progressive cavity discharge pumps enables the apparatus to deliver a range of materials to the final discharge point, e.g. subsoil of a field that the material is being applied to.

The macerating and pumping units that have been described, and that include multiple output/discharge pumps, have the discharge pumps mounted circumferentially around the re-circulating/agitating pump, which is a centrifugal vane pump.

To allow the agitating pump to pump the macerated matter to the output/discharge pumps so that the discharge pumps can then pump the matter through the pipes or hoses that are connected to them, the housings of the output/discharge pumps are rotated so as to align openings in the housing with corresponding openings and passages that are associated with the agitating pump. Once the openings in the discharge pump housings are aligned with the openings and the passages associated with the agitating pump, the agitating pump is able to pump macerated matter to the discharge pumps through the aligned openings and passages.

The arrangement of the discharge pumps, and the method of rotating their housings to allow the discharge ports of the agitating pump to be aligned with the inlet ports of the discharge pumps, or to close off the inlet ports of the discharge pumps from the discharge ports of the agitating pump so that material/matter is unable to flow from the agitating pump to the discharge pumps, dispenses with the need to have separate control valves, etc. fitted to the apparatus for flow regulation and control, and allows for regulation/adjustment of the output flow rate of the matter from the outlets of the pipes/hoses that are connected to the outlets of the discharge pumps.

The flow path of the material/matter through the discharge pipes or hoses that are connected to the output ports/nozzles of the discharge pumps is able to be minimised by having the material flow through a tyne pivot/pivot member that the ground-engaging tool of the apparatus is secured relative to. This also allows for the discharge hoses/pipes to be large diameter hoses/pipes. To achieve a desired flow rate of dense slurry/matter through the discharge hoses/pipes, it is desirable for the discharge hoses/pipes to have a large diameter and to be of the shortest possible length.

The apparatus that includes the macerating and pumping unit, and that discharges the macerated matter from an outlet, is able to discharge the macerated matter as an extrusion either into the subsoil of a field that has been tilled by the apparatus, or onto the surface of the tilled field.

The drive train of the apparatus, including the drive train of the macerating and pumping unit of the apparatus, is arranged/designed/configured so that adjustments can be made to it so as to optimise the way various components of the apparatus and/or macerating and pumping unit interact with each other to provide the desired consistency of the material/matter that is extruded by the apparatus, and to control the speed or rate at which the extrusion is delivered or applied to the soil of a field.

The apparatus is able to overcome the problem that is associated with the pelletising process of destroying living organisms that are a desirable product of the composting process, and of destroying the desirable structure of the charcoal particles that may be added to the compost or manure as part of the pelletising process. Thus, the apparatus/macerating and pumping unit are able to produce a continuous solid subsoil extrusion without having any detrimental effects on the quality of the material that the apparatus/unit extrudes. The apparatus/macerating and pumping unit, as well as the process/method they use to produce an extrusion, allow the structure of any charcoal in the material/matter that is to be extruded to remain at least somewhat intact.

The extrusion is a concentrated extrusion containing materials that are able to retain moisture and nutrients for an extended period and that are able to provide extended sustenance, sanctuary, and refuge to beneficial soil microbiology.

In addition, it is able to overcome the problem of transport logistics that is associated with the pelletising process, and that requires the transportation of raw, materials such as manure and compost to a pelletising plant or facility, and then transportation of the pellets from the plant to the field that they are to be applied to. This is because, the apparatus itself is able to process the raw materials that are at hand, and to then deposit the extruded materials into or onto the field without the need for an extra processing step to be carried out on the materials at a location which is remote from the field.

It is desirable to optimise and conserve the water resources, such as rain or irrigation water, that are available to a crop that is growing or that is to be grown in a field. The apparatus is able to place a consolidated (water permeable) solid extrusion of macerated material/matter below or at the bottom of a formed furrow, for example, and the extrusion is able to act as a moisture harvesting and moisture storing agent.

An idea behind the apparatus is to attempt to optimise the time and energy spent tilling, applying amendments, seeding, and planting a field. Consolidating materials/matter into an extruded solid form and depositing the extrusion into or onto the field allows the placed extrusion to remain intact for several seasons. The same extrusions once placed can be utilised in multiple growing seasons.

The apparatus is able to be used to consolidate and improve the operations that are normally involved in producing and applying to a field a solid extrusion of consolidated materials that contains living biological organisms.

The apparatus is able to apply the extrusion as a continuous band to the subsoil of a field, and is able to perform seeding and/or planting in the same operation.

All of the prior art apparatus mentioned earlier lack the ability to receive, macerate, agitate, and discharge dry or substantially dry material into or onto a field. They also lack the ability to process dry material, with the addition of a liquid, into a slurry by means of re-circulating the material including the liquid multiple times through a macerator. Any dry material must be processed into a slurry before being loaded into those prior art machines/apparatus.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

Throughout the specification and claims, unless the context requires otherwise, the word "comprise" or variations such as "comprises" or "comprising", will be understood to imply the inclusion of a stated integer or group of integers but not the exclusion of any other integer or group of integers.

Throughout the specification and claims, unless the context requires otherwise, the term "substantially" or "about" will be understood to not be limited to the value for the range qualified by the terms.

It will be clearly understood that, if a prior art publication is referred to herein, that reference does not constitute an admission that the publication forms part of the common general knowledge in the art in Australia or in any other country.

The invention claimed is:

1. An agricultural apparatus for applying matter to a field, the apparatus comprising: a body able to moved along the field, the body including a macerator for macerating matter; an agitating pump; and at least one discharge pump; wherein the agitating pump is provided to agitate and pump the matter after having been macerated by the macerator; and each discharge pump is connected to the agitating pump to provide additional pumping, in addition to pumping after the material has passed through the macerator and the agitating pump, with the amount of liquid in the macerated material being insufficient to provide a slurry, so as to be of extrudable consistency to allow the discharge pump to discharge the macerated material through an outlet as an extrusion for being applied to the field.

2. An agricultural apparatus as claimed in claim 1 wherein each discharge pump is connected to the agitating pump with the housing of the discharge pump being rotatable relative to the housing of the agitator pump so as to allow alignment of an opening in the housing of the discharge pump with a corresponding opening associated with the agitating pump.

3. An agricultural apparatus as claimed in claim 2 wherein rotating the housing of each discharge pump enables the rate at which material is pumped by the discharge pump to be controlled or regulated.

4. An agricultural apparatus as claimed in claim 2 wherein each discharge pump is connected to a respective arm the length of which can be adjusted to vary the degree to which the opening of the discharge pump is able to be aligned with the corresponding opening associated with the agitating pump.

5. An agricultural apparatus as claimed in claim 1 wherein rotating the housing of each discharge pump allows a corresponding discharge port of the agitating pump to be aligned with an inlet port of the discharge pump, or to close off the inlet port of the discharge pump from the discharge port of the agitating pump so that material is unable to flow from the agitating pump to the discharge pump.

6. An agricultural apparatus as claimed in claim 1 wherein each discharge pump is received within the housing of the agitating pump.

7. An agricultural apparatus as claimed in claim 1 wherein the at least one discharge pump comprises a plurality of discharge pumps mounted circumferentially around the agitating pump.

8. An agricultural apparatus as claimed in claim 7 including a respective drive gear secured to a shaft of each discharge pump with a plurality of idler gears engaging the respective drive gears such that rotating one of the idler gears or the drive gears rotates the other idler gears and drive gears.

9. An agricultural apparatus as claimed in claim 1 wherein each discharge pump assists in maintaining the speed of the material leaving the agitating pump as the flow of the mixture changes direction through 90 degrees as the material flows from the agitating pump through each discharge pump.

10. An agricultural apparatus as claimed in claim 9 wherein the agitating pump comprises a vane pump.

11. An agricultural apparatus as claimed in claim 10 wherein the vane pump includes a plurality of vanes, a generally cylindrical housing and a plurality of macerating blades secured to the vanes.

12. An agricultural apparatus as claimed in claim 11 wherein the vane pump comprises a plurality of thick steel plates each with outwardly radiating curved arms, the plates being positioned side by side such that the arms form rotor vanes of the pump.

13. An agricultural apparatus as claimed in claim 1 wherein each discharge pump comprises a helical flange type pump or progressive cavity pump.

14. An agricultural apparatus as claimed in claim 1 wherein each discharge pump comprises an auger or a screw propeller.

15. An agricultural apparatus as claimed in claim 1 wherein the agitating pump comprises a re-circulating pump for re-circulating material back into a vessel of the agricultural apparatus, where the vessel is arranged to feed matter into the macerator.

16. An agricultural apparatus as claimed in claim 15 wherein the vessel comprises a hopper for allowing matter to fall into the macerator, the agitating pump further including a chute such that a rotor of the agitating pump is able to recirculate matter out of the housing of the agitator pump through openings in an upper portion of the housing, through the chute into the hopper.

17. An agricultural apparatus as claimed in claim 16 wherein each discharge pump can be closed allowing water to be added to the vessel so that when the agitating pump and macerator are started, the water is drawn from the vessel by the agitating pump which then pumps or re-circulates the water back into the vessel.

18. An agricultural apparatus as claimed in claim 1 wherein the macerated material can be pumped out of the outlet as an extrusion and not a slurry.

19. An agricultural apparatus as claimed in claim 18 wherein the apparatus includes a ground engaging tool and the extrusion is provided as a consolidated, water permeable, solid extrusion of macerated matter below or at the bottom of a furrow formed by the ground engaging tool.

20. An agricultural apparatus as claimed in claim 18 wherein the extrusion is provided to retain moisture and nutrients for a period.

21. An agricultural apparatus as claimed in claim 18 arranged for processing raw organic materials that are at hand, and then to deposit the extruded materials into or onto the field without the need for an extra processing step to be carried out on the raw organic materials at a location which is remote from the field.

22. An agricultural apparatus as claimed in claim 1 including a frame for mounting the macerator, the agitator pump and the at least one discharge pump; a drawbar for coupling the apparatus to a towing vehicle; a pair of rotatable wheels secured relative to the frame; and a drive shaft able to drive the macerator and the agitator pump by rotating the drive shaft about a longitudinal axis thereof.

23. An agricultural apparatus as claimed in claim 1 wherein the macerator, the agitating pump, and each discharge pump are each driven by a shaft connectable to a power take-off of a vehicle.

24. An agricultural apparatus as claimed in claim 1 including a drive train configured to control the speed or rate at which the extrusion is delivered to the soil of a field.

25. An agricultural apparatus as claimed in claim 1 including a stone trap for trapping stones and other debris entering the macerator.

26. A method for applying matter to a field, the method comprising: macerating the matter; agitating the macerated matter; tilling the field; and discharging the macerated matter using at least one discharge pump wherein, in the method, each discharge pump is connected to an agitator pump such that when a corresponding opening of the agitator pump and an opening of the discharge pump are aligned, the matter is propelled through the aligned openings of the agitator pump and the discharge pump, the method discharging macerated material though an outlet as an extrusion, the extrusion acting as a moisture harvesting and moisture storing agent that remains intact beneath soil.

27. A method as claimed in claim 26 wherein macerating includes forcing the matter through a macerating plate with an auger; storing the matter in a hopper; and returning the macerated matter to the hopper.

28. A method as claimed in claim 26 including ripping the ground to a depth and laying a water drip pipe alongside the matter that is discharged into or onto the tilled field.

29. A method as claimed in claim 26 wherein the macerated material is provided as a continuous band to the subsoil of a field and seeding or planting occurs in the same operation.

30. A macerating and pumping apparatus comprising:
a body able to be moved along a field, the body including a macerator for macerating matter stored in a vessel, a discharge pump for pumping the macerated matter out of an outlet, and an agitating pump for pumping the macerated matter to at least one discharge pump, each discharge pump adapted to pump macerated material out of the outlet as an extrusion and into the field; the extrusion being adapted to retain moisture and nutrients for a period of time.

31. A method for applying matter to a field, the method comprising: providing a body able to be moved along the field, the body including a macerator for macerating matter, an agitating pump, and at least one discharge pump; macerating the matter using the macerator; agitating the macerated matter using the agitating pump; tilling the field; and discharging the macerated matter using at the least one discharge pump wherein, in the method, each discharge pump is connected to the agitator pump to provide additional pumping, in addition to pumping after the material has passed through the macerator and the agitating pump, with the amount of liquid in the macerated material being insufficient to provide a slurry, so as to be of extrudable consistency, to allow the discharge pump to discharge the macerated material through an outlet as an extrusion for being applied to the field.

* * * * *